(12) United States Patent
Nakanishi

(10) Patent No.: US 11,487,270 B2
(45) Date of Patent: Nov. 1, 2022

(54) INDUSTRIAL MACHINE MANAGEMENT SYSTEM, METHOD FOR MANAGING INDUSTRIAL MACHINE, AND NON-TRANSITORY COMPUTER-READABLE STORAGE MEDIUM

(71) Applicant: Kabushiki Kaisha Yaskawa Denki, Kitakyushu (JP)

(72) Inventor: Mitsuaki Nakanishi, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 136 days.

(21) Appl. No.: 16/773,261

(22) Filed: Jan. 27, 2020

(65) Prior Publication Data
US 2020/0241503 A1    Jul. 30, 2020

(30) Foreign Application Priority Data
Jan. 28, 2019 (JP) .............................. JP2019-012166

(51) Int. Cl.
*G05B 19/408* (2006.01)
*G05B 19/406* (2006.01)

(52) U.S. Cl.
CPC ....... *G05B 19/4083* (2013.01); *G05B 19/406* (2013.01); *G05B 2219/31439* (2013.01); *G05B 2219/40157* (2013.01)

(58) Field of Classification Search
None
See application file for complete search history.

(56) References Cited

U.S. PATENT DOCUMENTS 6,785,786 B1 * 8/2004 Gold ................... G06F 11/1469
711/162
2003/0093709 A1    5/2003 Ogawa et al.
(Continued)

FOREIGN PATENT DOCUMENTS

JP        2003-152721 A        5/2003
JP        2004-5400 A          1/2004
(Continued)

OTHER PUBLICATIONS

Office Action dated Aug. 25, 2020 in corresponding Japanese Patent Application No. 2019-012166, (with Partial English Translation), 5 pages.
(Continued)

*Primary Examiner* — Mohammad Ali
*Assistant Examiner* — David Earl Ogg
(74) *Attorney, Agent, or Firm* — Oblon, McClelland, Maier & Neustadt, L.L.P.

(57) ABSTRACT

An industrial machine management system includes circuitry that collects changeable setting data of an industrial machine, determines, based on the setting data at each time point of multiple time points, whether a change has been made to the setting data, obtains change information regarding the change when the change is determined as having been made to the setting data, determines whether a predetermined event has occurred in the industrial machine, identifies, when the predetermined event is determined as having occurred, the change information such that the change information is related to the predetermined event, and outputs the change information that is identified.

20 Claims, 12 Drawing Sheets

(56) References Cited

U.S. PATENT DOCUMENTS

| | | | |
|---|---|---|---|
| 2004/0168201 A1* | 8/2004 | Tada | G06F 11/1433 725/132 |
| 2005/0027656 A1* | 2/2005 | Tobler | G06Q 10/06 705/53 |
| 2005/0075752 A1* | 4/2005 | Ban | G05B 19/4182 700/213 |
| 2006/0200698 A1* | 9/2006 | Pillai | G06F 11/1456 714/6.12 |
| 2007/0097409 A1* | 5/2007 | Goings | G06F 3/1234 358/1.14 |
| 2008/0079559 A1* | 4/2008 | Tambascio | G05B 23/0235 340/506 |
| 2014/0337277 A1* | 11/2014 | Asenjo | G06Q 10/06 707/603 |
| 2015/0121556 A1 | 4/2015 | Hashimoto et al. | |
| 2016/0246662 A1* | 8/2016 | Meng | G06F 11/0787 |
| 2016/0335858 A1* | 11/2016 | Burd | G06Q 10/06 |
| 2017/0153608 A1 | 6/2017 | Ueda et al. | |

FOREIGN PATENT DOCUMENTS

| | | |
|---|---|---|
| JP | 2015-087879 A | 5/2015 |
| JP | 2017-102648 A | 6/2017 |

OTHER PUBLICATIONS

Japanese Office Action dated Jan. 12, 2021 in Japanese Patent Application No. 2019-012166, 5 pages.
Extended European Search Report dated Mar. 19, 2020 in European Patent Application No. 20153871.7, 7 pages.
European Office Action dated Dec. 15, 2021 in Application No. 20 153 871.7.

* cited by examiner

FIG. 2

Registration screen

Register setting data related to alarm occurrable in controller X.

| Alarm code | Alarm name | Related setting data |
|---|---|---|
| 001 | Torque abnormality | Program A |
| | | Parameter B |
| | | |
| 002 | Temp. abnormality | |
| 003 | Speed abnormality | Program C |
| | | |
| ⋮ | ⋮ | ⋮ |

FIG. 3

Alarm list screen

The following are alarms that occurred in the past one month.
Select an alarm to check a change made to setting data related to the alarm.

| Controller | Date and time | Alarm code | Alarm name |
|---|---|---|---|
| Controller X | 2019/01/16 10:25:08 | 003 | Speed abnormality |
| Controller Y | 2019/01/15 16:07:25 | 109 | High CPU usage |
| Controller Z | 2019/01/11 09:41:55 | 024 | Reducer abnormality |
| . | . | . | . |
| . | . | . | . |
| . | . | . | . |

Alarm detail screen

Controller in which alarm occurred: Controller X
Date and time of alarm occurrence: 2019/01/16 10:25:08
Alarm code: 003   Alarm name: Speed abnormality
Setting data related to this alarm: Program C
　　　　　The following are changes made to program C.

```
/JOB
//NAME ZMOVE_3-8
.
.
.
//GROUP1 RB1
NOP
MOVJ C00000 VJ=100.00
MOVJ C00001 VJ=100.00
MOVJ C00002 VJ=100.00
MOVJ C00003 VJ=100.00
.
.
.
END
```
2019/01/10 (Old version)

```
/JOB
//NAME ZMOVE_3-8
.
.
.
//GROUP1 RB1
NOP
MOVJ C00000 VJ=100.00
MOVJ C00001 VJ=80.00
MOVJ C00002 VJ=80.00
MOVJ C00003 VJ=100.00
.
.
.
END
```
2019/01/15 (Latest version)

FIG. 6

| Controller name | Backup information | | | Occurring alarm information | | |
|---|---|---|---|---|---|---|
| | Date | Setting data | Changed-unchanged info | Date and time | Alarm code | Alarm name |
| Controller X | 2019/1/15 | Prog. A, Para. B, Prog. C · · · | Changed: Prog. A, Para. B | 2019/1/16 10:25:08 | 003 | Speed abnormality |
| | 2019/1/11 | Prog. A, Para. B, Prog. C · · · | Changed: Prog. C | 2019/1/4 14:01:53 | 001 | Torque abnormality |
| | 2019/1/10 | Prog. A, Para. B, Prog. C · · · | Not changed | 2018/12/20 09:01:10 | 109 | High CPU usage |
| | · · | · · | · · | · · | · · | · · |
| Controller Y | 2019/1/15 | Prog. D, Para. E, Prog. F · · · | Changed: Prog. F | 2019/1/15 16:07:25 | 109 | High CPU usage |
| | 2019/1/11 | Prog. D, Para. E, Prog. F · · · | Not changed | 2019/1/8 14:24:41 | 002 | Temperature abnormality |
| | 2019/1/10 | Prog. D, Para. E, Prog. F · · · | Not changed | 2019/1/7 17:24:55 | 074 | Sputtering abnormality |
| | · · | · · | · · | · · | · · | · · |
| Controller Z | 2019/1/15 | Prog. G, Prog. H, Prog. I · · · | Not changed | 2019/1/11 09:41:55 | 024 | Reducer abnormality |
| | 2019/1/11 | Prog. G, Prog. H, Prog. I · · · | Not changed | 2019/1/9 13:11:43 | 001 | Torque abnormality |
| | 2019/1/10 | Prog. G, Prog. H, Prog. I · · · | Changed: Prog. I | 2019/1/9 11:36:41 | 015 | Holding abnormality |
| | · · | · · | · · | · · | · · | · · |

FIG. 7

| Controller name | Alarm code | Alarm name | Setting data |
|---|---|---|---|
| Controller X | 001 | Torque abnormality | Program A, Parameter B |
| | 002 | Temperature abnormality | — |
| | 003 | Speed abnormality | Program C |
| | ... | ... | ... |
| | ... | ... | ... |
| | ... | ... | ... |
| Controller Y | 001 | Torque abnormality | Parameter D, Parameter E |
| | 002 | Temperature abnormality | Program F |
| | 003 | Speed abnormality | — |
| | ... | ... | ... |
| | ... | ... | ... |
| | ... | ... | ... |
| Controller Z | 001 | Torque abnormality | — |
| | 002 | Temperature abnormality | Program G, Program H |
| | 003 | Speed abnormality | Program I |
| | ... | ... | ... |
| | ... | ... | ... |
| | ... | ... | ... |

FIG. 12

| Controller name | Alarm code | Alarm name | Setting data | Degree of relation |
|---|---|---|---|---|
| Controller X | 001 | Torque abnormality | Program A | 8 |
| | | | Parameter B | 5 |
| | | | Program C | 4 |
| | | | ⋮ | ⋮ |
| | 002 | Temperature abnormality | Program A | 0 |
| | | | Parameter B | 3 |
| | | | Program C | 2 |
| | | | ⋮ | ⋮ |
| | 003 | Speed abnormality | Program A | 6 |
| | | | Parameter B | 3 |
| | | | Program C | 10 |
| | | | ⋮ | ⋮ |
| | ⋮ | ⋮ | ⋮ | ⋮ |
| Controller Y | 001 | Torque abnormality | Parameter D | 4 |
| | | | Parameter E | 9 |
| | | | Program F | 3 |
| | | | ⋮ | ⋮ |
| | 002 | Temperature abnormality | Parameter D | 1 |
| | | | Parameter E | 6 |
| | | | Program F | 5 |
| | | | ⋮ | ⋮ |
| | 003 | Speed abnormality | Parameter D | 3 |
| | | | Parameter E | 4 |
| | | | Program F | 10 |
| | | | ⋮ | ⋮ |
| | ⋮ | ⋮ | ⋮ | ⋮ |
| Controller Z | 001 | Torque abnormality | Program G | 15 |
| | | | Program H | 2 |
| | | | Program I | 3 |
| | | | ⋮ | ⋮ |
| | 002 | Temperature abnormality | Program G | 1 |
| | | | Program H | 7 |
| | | | Program I | 4 |
| | | | ⋮ | ⋮ |
| | 003 | Speed abnormality | Program G | 2 |
| | | | Program H | 5 |
| | | | Program I | 1 |
| | | | ⋮ | ⋮ |
| | ⋮ | ⋮ | ⋮ | ⋮ |

INDUSTRIAL MACHINE MANAGEMENT SYSTEM, METHOD FOR MANAGING INDUSTRIAL MACHINE, AND NON-TRANSITORY COMPUTER-READABLE STORAGE MEDIUM

CROSS-REFERENCE TO RELATED APPLICATIONS

The present application claims priority under 35 U.S.C. § 119 to Japanese Patent Application No. 2019-012166, filed Jan. 28, 2019. The contents of this application are incorporated herein by reference in their entirety.

BACKGROUND

Field of the Invention

The embodiments disclosed herein relate to an industrial machine management system, a method for managing an industrial machine, and a non-transitory computer-readable storage medium.

Discussion of the Background

JP 2015-087879A discloses a system that makes parameters of an industrial machine adjustable by connecting an engineering tool to the industrial machine, and that makes the industrial machine upload the resulting parameters to a cloud server for backup and other purposes.

SUMMARY

According to one aspect of the present invention, an industrial machine management system includes circuitry that collects changeable setting data of an industrial machine, determines, based on the setting data at each time point of multiple time points, whether a change has been made to the setting data, obtains change information regarding the change when the change is determined as having been made to the setting data, determines whether a predetermined event has occurred in the industrial machine, identifies, when the predetermined event is determined as having occurred, the change information such that the change information is related to the predetermined event, and outputs the change information that is identified.

According to another aspect of the present invention, a method for managing an industrial machine includes collecting changeable setting data of the industrial machine, determining, based on the setting data at each time point of multiple time points, whether a change has been made to the setting data, obtaining change information regarding the change when the change is determined as having been made to the setting data, determining whether a predetermined event has occurred in the industrial machine, identifying, when the predetermined event is determined as having occurred, the change information such that the change information is related to the predetermined event, and outputting the change information that is identified.

According to yet another aspect of the present invention, a non-transitory computer-readable storage medium is storing a program for causing a computer to execute a method for managing an industrial machine. The method includes collecting changeable setting data of the industrial machine, determining, based on the setting data at each time point of multiple time points, whether a change has been made to the setting data, obtaining change information regarding the change when the change is determined as having been made to the setting data, determining whether a predetermined event has occurred in the industrial machine, identifying, when the predetermined event is determined as having occurred, the change information such that the change information is related to the predetermined event, and outputting the change information that is identified.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 illustrates an example registration screen;

FIG. 3 illustrates an example alarm list screen;

FIG. 4 illustrates an example alarm detail screen;

FIG. 6 illustrates an example of how data are stored in a controller database;

FIG. 7 illustrates an example of how data are stored in a relation database;

FIG. 12 illustrates an example relation database of a modification;

DESCRIPTION OF THE EMBODIMENTS

1. General Arrangement of Industrial Machine Management System

According to the inventors' knowledge and experience, making a change to setting data of an industrial machine, such as a program and a parameter, may cause a predetermined event such as alarming and degraded performance in the industrial machine. It is highly laborious to identify the piece of setting data, among a large number of pieces of setting data, that caused the predetermined event. In light of the considerations above, the inventors conducted extensive studies in an attempt to assist an analysis for what caused a predetermined event in an industrial machine, and as a result, have conceived of a novel and unique industrial machine management system and a related machine and a related method. An industrial machine management system and a related machine and a related method according to an embodiment will be described in detail below.

Figure 1:
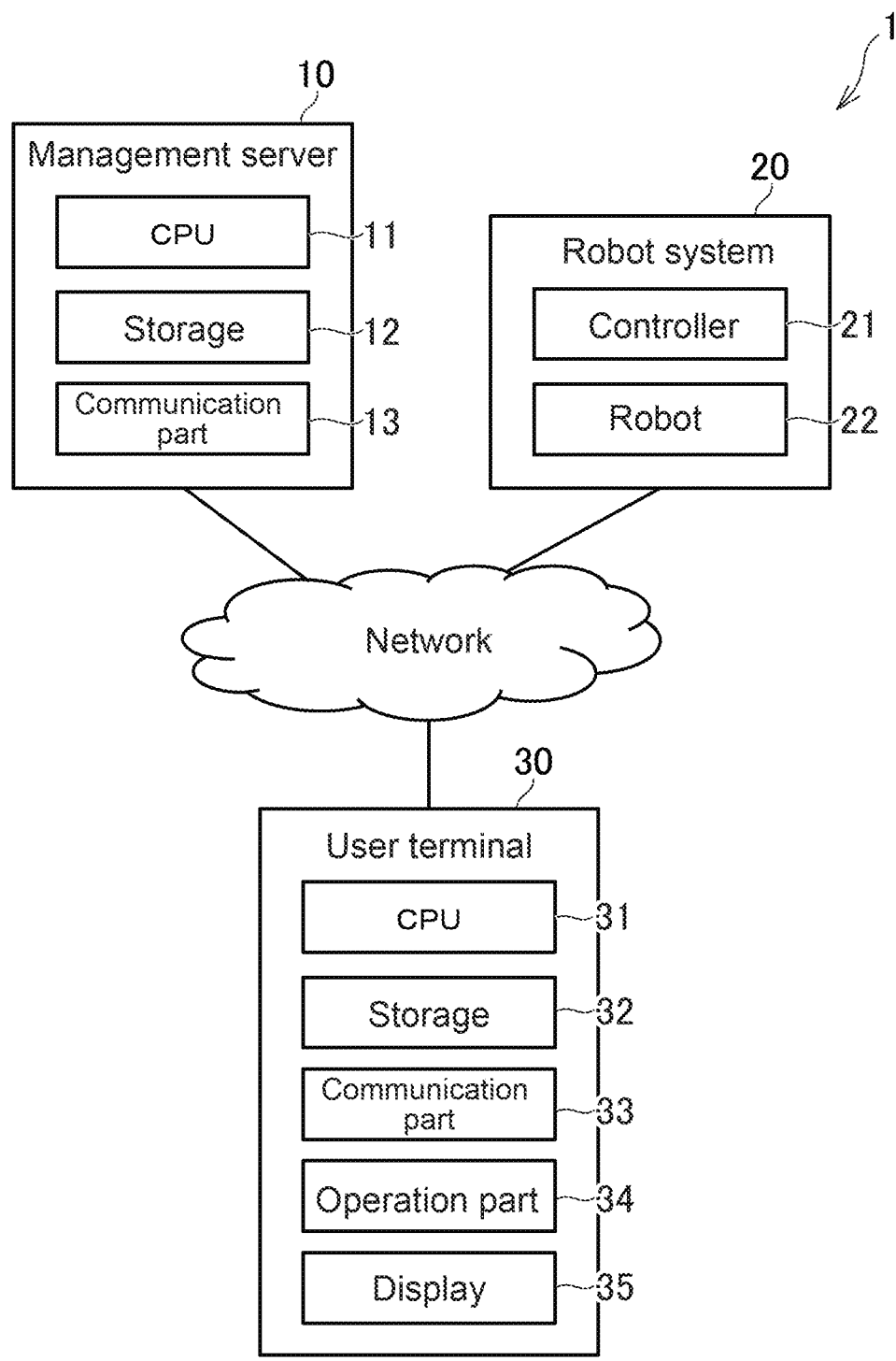
FIG. 1 illustrates a general arrangement of an industrial machine management system (1) according to an embodiment.

FIG. 1 is a diagram illustrating a general arrangement of an industrial machine management system 1 according to an embodiment. As illustrated in FIG. 1, the industrial machine management system 1 includes a management server 10, a robot system 20, and a user terminal 30. The management server 10, the robot system 20, and the user terminal 30 are connected to a network such as a local area network (LAN) or the Internet or another network. While FIG. 1 illustrates a single management server 10, a single robot system 20, and a single user terminal 30, these elements may be provided in plural.

The management server 10 is a server computer. It is to be noted that the management server 10 may be implemented by a computer such as a personal computer, a mobile phone (including a smartphone), and a portable terminal (including a tablet terminal), if the computer has functions of a server. The management server 10 includes a CPU 11, a storage 12, and a communication part 13.

The CPU 11 includes at least one processor. The storage 12 includes: a volatile memory such as RAM; and a non-volatile memory such as a hard disc. With this configuration, the storage 12 stores various programs and data. The CPU 11 performs various kinds of processing based on these programs and data. The CPU 11 includes a circuit or a plurality of circuits (circuitry) to perform various kinds of processing based on these programs and data. The communication part 13 includes a communication interface such as a network card and various communication connectors. With this configuration, the communication part 13 communicates with other apparatuses and/or devices.

The robot system 20 includes a controller 21 and a robot 22. While FIG. 1 illustrates a single controller 21 and a single robot 22, these elements may be provided in plural. For example, the robot system 20 may include a plurality of controllers 21, or a single controller 21 may control a plurality of robots 22.

The controller 21 is a computer that controls the robot 22. While the controller 21 may be a specialized controller dedicated to the robot 22, the controller 21 according to this embodiment is a general-purpose computer. The controller 21 includes hardware such as a CPU, a RAM, a hard disc, and a communication interface. With this configuration, the controller 21 transmits a motion instruction to the robot 22.

The robot 22 is an industrial robot. The robot 22 may be a general-purpose multi-articular robot, examples including, but not limited to, a vertical multi-articular robot, a horizontal multi-articular robot, and a gantry robot. The robot 22 may have any number of arms; for example, the robot 22 may have a single arm or a plurality of arms. The robot 22 may be used in any applications, examples including, but not limited to, welding such as gas welding or arc welding, assembly of parts, and processing of food and/or food products.

The controller 21 and the robot 22 are non-limiting examples of the industrial machine recited in the appended claims. Thus, the controller 21 and the robot 22 recited in this embodiment can be replaced with the industrial machine. Any type of industrial machines are applicable to the industrial machine management system 1, examples of the industrial machine including, but not limited to, a motor controller, a servo motor, an inverter, a machine tool, and a Programmable Logic Controller (PLC). Any of these industrial machines may operate in the industrial machine management system 1.

The robot system 20 may also include an apparatus or a device other than the controller 21 and the robot 22. A non-limiting example is a sensor that detects a motion status in which the robot 22 is making a motion. The sensor may be any sensor such as a torque sensor, a motor encoder, a proximity sensor, a holding sensor, a pressure sensitive sensor, a motion sensor, a sputtering sensor, and a temperature sensor. The robot system 20 may also include: a camera that takes an image of a motion of the robot 22; and/or an input-output (I/O) device that receives and outputs data.

The user terminal 30 is a computer operated by a user. In this embodiment, the user is in charge of management of the robot system 20 as a whole, and is a person different from a worker who manages the controller 21 and a worker who manages the robot 22. Another possible example is that the workers correspond to the user. Examples of the user terminal 30 include, but are not limited to, a personal computer, a mobile phone (including a smartphone), and a portable terminal (including a tablet terminal).

The user terminal 30 includes a CPU 31, a storage 32, a communication part 33, an operation part 34, and a display 35. The CPU 31, the storage 32, and the communication part 33 may be similar in hardware configuration respectively to the CPU 11, the storage 12, and the communication part 13. The operation part 34 is an input device made up of a mouse, a keyboard, and/or a related device. Examples of the display 35 include, but are not limited to, a liquid crystal display and an organic electroluminescent (EL) display. In response to an instruction from the CPU 31, the display 35 displays various screens.

It is to be noted that the programs and data described as is stored in the management server 10, the controller 21, and the user terminal 30 may be supplied to these elements through the network. It is also to be noted that each of the management server 10, the controller 21, and the user terminal 30 will not be limited to the above-described hardware configuration but may have any other hardware configuration. For example, any of the management server 10, the controller 21, and the user terminal 30 may include: a reader that reads a computer readable information storage medium (examples including an optical disc drive and a memory card slot); and/or an input/output device directly connectable to external devices (examples including a USB terminal). In this case, programs and/or data stored in an information storage medium may be supplied to the above elements through the reader and/or the input/output device.

2. Outline of Industrial Machine Management System

In the industrial machine management system 1, the controller 21 controls motions of the robot 22 based on setting data stored in the controller 21 itself. As used herein, the term "setting data" refers to data of settings associated with motions of the robot 22, examples including, but not limited to, programs and parameters. Thus, the programs and/or the parameters recited in this embodiment as is stored in the controller 21 may be replaced with the setting data.

A program may also be referred to as a job or a task, and encompasses a program code of a command (instruction) to the robot 22. In addition to a command to the robot 22, a program code may include: a variable(s) involved when the command is executed; and/or other information such as a comment, a header, and other additional notes related to the command. The programming language used in the program code may be any language known in the art, examples including, but not limited to, C language, C++, Java (®, registered trademark), and Python.

In one possible example, motions of the robot 22 are defined in a program code. For example, when the robot 22 makes motions periodically, motions of the robot 22 corresponding to the respective periods are described in the program code on a time-series basis. In another possible example, a track of the robot 22 is defined in a program code. The method of generating a track of the robot 22 may be any method known in the art, examples including, but not limited to, linear interpolation and link interpolation. In the program code, time-series positions of the robot 22 are defined. In another possible example, a wait command to the robot 22 is defined in a program code. The wait command shows the period of time for which the robot 22 waits, instead of making a movement. In another possible example, the timing and/or the strength at which the robot 22 opens and closes its hand is defined in a program code. In another possible example, the output of an electric gun mounted on the robot 22 is defined in a program code.

A parameter is a value output to the robot 22, examples including, but not limited to, the number of rotations of a motor(s) (speed), the rotational angle of the motor(s), torque value, current value, and the period of time for which current is on. A parameter may be referred to by a program or may be described in the program. A position of the robot 22 described in the program and waiting time described in the program may be regarded as kinds of parameter. For example, individual parameters may be regarded as setting data, or a parameter file in which a plurality of parameters are stored may be regarded as setting data. In the parameter file, the values of the parameter may be described on a time-series basis.

The robot system 20 is installed in a factory, a plant, or another industrial facility, and a change is made to the setting data by a worker who manages the controller 21 and the robot 22 (or a worker who manages the controller 21 and/or a worker who manages the robot 22). As used herein, the term "change" encompasses an update, an editing, and an adjustment. In one example, the worker checks a motion that the robot 22 is actually making and/or checks a state that an object (workpiece) worked on by the robot 22 is in. In this manner, the worker determines whether it is necessary to change the setting data. In another example, the worker checks whether an alarm has occurred in the controller 21, and/or checks a stop situation of the robot 22. In this manner, the worker determines whether it is necessary to change the setting data.

When the worker determines that it is necessary to change the setting data, the worker connects, for example, an engineering tool-equipped terminal to the controller 21, and changes the setting data. In one example, the worker changes a program by making an addition to, changing, or deleting a program code or by changing the value of a variable in the program. In another example, the worker prepares a new program and/or deletes an unnecessary program. In another example, the worker changes a program by changing the value of a parameter and/or deleting a parameter that is no longer necessary. In another example, the worker adds a new parameter or deletes an unnecessary parameter.

Making a change to the setting data may cause the controller 21 and the robot 22 to operate differently, and this may cause a predetermined event to occur. In light of this, this embodiment makes the user specify in advance setting data related to a predetermined event; and when the predetermined event occurs, displays information regarding a change made to the setting data specified by the user.

As used herein, the term "predetermined event" is intended to mean any event specified in advance. Examples of the event include, but are not limited to, an occurrence of an alarm, degradation of performance of the controller 21 or the robot 22, contact or interference between the robots 22, an event in which the motion status of the controller 21 or the robot 22 falls outside a reference range, and an event in which a particular switch is turned on. Examples of the motion status of the controller 21 or the robot 22 include, but are not limited to, a waveform of a torque signal, maximum torque amount, a convergence value of the torque signal, the rising timing of the torque signal, the convergence timing of the torque signal, position information regarding the position of a motor, speed information regarding the speed of the motor, the amount of overshoot, settling time, tact time, cycle time, CPU usage, memory usage, and communication traffic.

As used herein, the phrase "setting data related to an event" is intended to mean a piece of setting data that may possibly have caused the event to occur. In other words, setting data related to an event is a piece of setting data that should be output when the event occurs. This embodiment is regarding a case where setting data related to an event is a piece of setting data regarded and specified by the user as being related to the event. That is, this embodiment is regarding a case where the user manually specifies setting data related to an event. It is to be noted, however, that setting data related to an event may be automatically specified based on a statistical analysis of a change made to setting data in relation to an occurrence of an alarm, as in modification 1 described later.

In this embodiment, an alarm will be described as an example event. Thus, the term "alarm" used in this embodiment can be replaced with "event". For example, when the user operates the user terminal 30 to access the management server 10, the display 35 displays a registration screen for registering setting data related to an alarm. While in this embodiment setting data related to an alarm is registered on an individual controller 21 basis, setting data related to an alarm may be common to the plurality of controllers 21.

FIG. 2 illustrates an example registration screen G1. As illustrated in FIG. 2, a name of a registration target controller 21 is displayed on the registration screen G1. The registration target controller 21 may be any controller 21; for example, the user specifies the registration target controller 21 before the registration target controller 21 is displayed on the registration screen G1. In the example illustrated in FIG. 2, it is "Controller X" in which setting data related to alarms are registered.

Thus, the user is able to select any piece of setting data stored in the registration target controller 21 and specify the piece of setting data as setting data related to an alarm. In this embodiment, alarms are classified by alarm codes, and a piece of setting data related to an alarm denoted by a corresponding alarm code is registered. It is to be noted that any number of setting data may be registered in relation to alarms and that the setting data may not necessarily be registered in relation to all alarms.

On the registration screen G1, the alarm denoted by alarm code "001" is torque abnormality, and setting data registered in relation to the alarm are "Program A" and "Parameter B". Also on the registration screen G1, the alarm denoted by alarm code "002" is temperature abnormality, and no setting data related to the alarm is registered yet. Also on the registration screen G1, the alarm denoted by alarm code "003" is speed abnormality, and setting data registered in relation to the alarm is "Program C". Thus, the registration screen G1 displays a list of registered setting data related to alarms denoted by alarm codes.

When the user has selected pull-down menu M10, M11, or M12, a list of setting data stored in the corresponding controller 21 appears. From the list, the user specifies a piece of setting data related to the alarm, thus registering the piece of setting data. It is to be noted that the user may not necessarily specify all pieces of setting data related to alarms; the setting data may be registered by default. It is also to be noted that the registration screen G1 may be adapted such that the user is able to cancel registration of a piece of setting data related to an alarm.

Registering setting data in relation to an alarm on the registration screen G1 ensures that when the alarm occurs, a change made to the setting data related to the alarm is displayed. For example, when an alarm occurs in the robot system 20, a notification such as an electronic mail is transmitted to the user terminal 30. In response to the notification, the user operates the user terminal 30 to access the management server 10, thereby causing the display 35 to display an alarm list screen on which a list of alarms that occurred are shown.

FIG. 3 illustrates an example alarm list screen G2. As illustrated in FIG. 3, the alarm list screen G2 displays names of controllers 21 in which alarms have occurred, dates and times of alarm occurrences, alarm codes, and alarm names. The alarm list screen G2 may display all or some of the alarms that occurred in the past.

When the user has selected an alarm displayed on the alarm list screen G2, the display 35 displays an alarm detail screen, which shows details of the alarm. The following description will focus on a case where the user has selected the alarm of "003", which occurred in "Controller X" at 10:25:08 on Jan. 16, 2019.

FIG. 4 illustrates an example alarm detail screen. As illustrated in FIG. 4, alarm detail screen G3 displays information regarding changes made to setting data related to the alarm of "003", which occurred in "Controller X". In the example illustrated in FIG. 4, "Program C" is registered as setting data related to the alarm of "003", and the alarm detail screen G3 displays the name of the program and content of the changes.

For example, the content of the changes is displayed in the form of a comparison between program codes of "Program C" at the alarm occurrence time and program codes of "Program C" before the alarm occurrence time. In the example illustrated in FIG. 4, "Program C" was changed on Jan. 11, 2019, and the alarm detail screen G3 displays: the latest version of the program codes at the time at which the alarm occurred (program codes obtained as a backup on Jan. 15, 2019, which is the day before the alarm occurred); and a previous version of the program codes obtained on Jan. 10, 2019, which is before the changes (that is, program codes one version previous to the latest version). It is to be noted that the previous version of the program codes that can be displayed on the alarm detail screen G3 may be two or more versions previous to the latest version, or that a plurality of previous versions may be displayed on the alarm detail screen G3 (for example, one version previous to the latest version and two versions previous to the latest version).

In this embodiment, the content of the changes made to the setting data is emphasized on the alarm detail screen G3. In the example illustrated in FIG. 4, the content of the changes is emphasized using underlines, showing that the movement command "MOVJ C00001 VJ=80.00" to the robot 22 and the movement command "MOVJ C00002 VJ=80.00" to the robot 22 are changed.

It is to be noted that the method of emphasizing the detail of the change will not be limited to the use of underlines, and any other method may be used. A possible example is to use a predetermined color, such as red and blue, to emphasize the detail of the change made to the setting data. Another possible example is to make the detail of the change larger in font size than the other elements of the setting data. Another possible example is to show the detail of the change in Italic or bold. Another possible example is to show the detail of the change using a particular font different from the other elements of the setting data.

By checking the alarm detail screen G3, the user estimates that the changes made to the movement commands may have caused the alarm of "003". It is to be noted, however, that the content displayed on the alarm detail screen G3 only indicates a possibility of what caused the alarm, and may not necessarily show that the content actually caused the alarm. Under the circumstances, the user considers other possible factors comprehensively and performs an analysis for what caused the alarm.

It is to be noted that when a parameter is registered as setting data related to an alarm, the alarm detail screen G3 displays a name of the registered parameter and content of a change(s) made to the parameter. In one example, the content of the change to be shown may be the amount by which the parameter was changed. In another example, when a parameter selected includes values aligned on a time-series basis, the content of the change may be the time point at which the parameter was changed. In another example, when a parameter file selected stores a plurality of parameters, the content of the change may be a parameter, among the plurality of parameters, that was changed.

Thus, the industrial machine management system 1 according to this embodiment registers in advance pieces of setting data related to alarms. When an alarm occurs in a controller 21, the alarm detail screen G3 displays name and change content associated with a piece of setting data related to the alarm. In this manner, the industrial machine management system 1 assists an analysis for what caused an alarm in an industrial machine. The industrial machine management system 1 according to this embodiment will be described in more detail below.

3. Functions of Industrial Machine Management System

Figure 5:
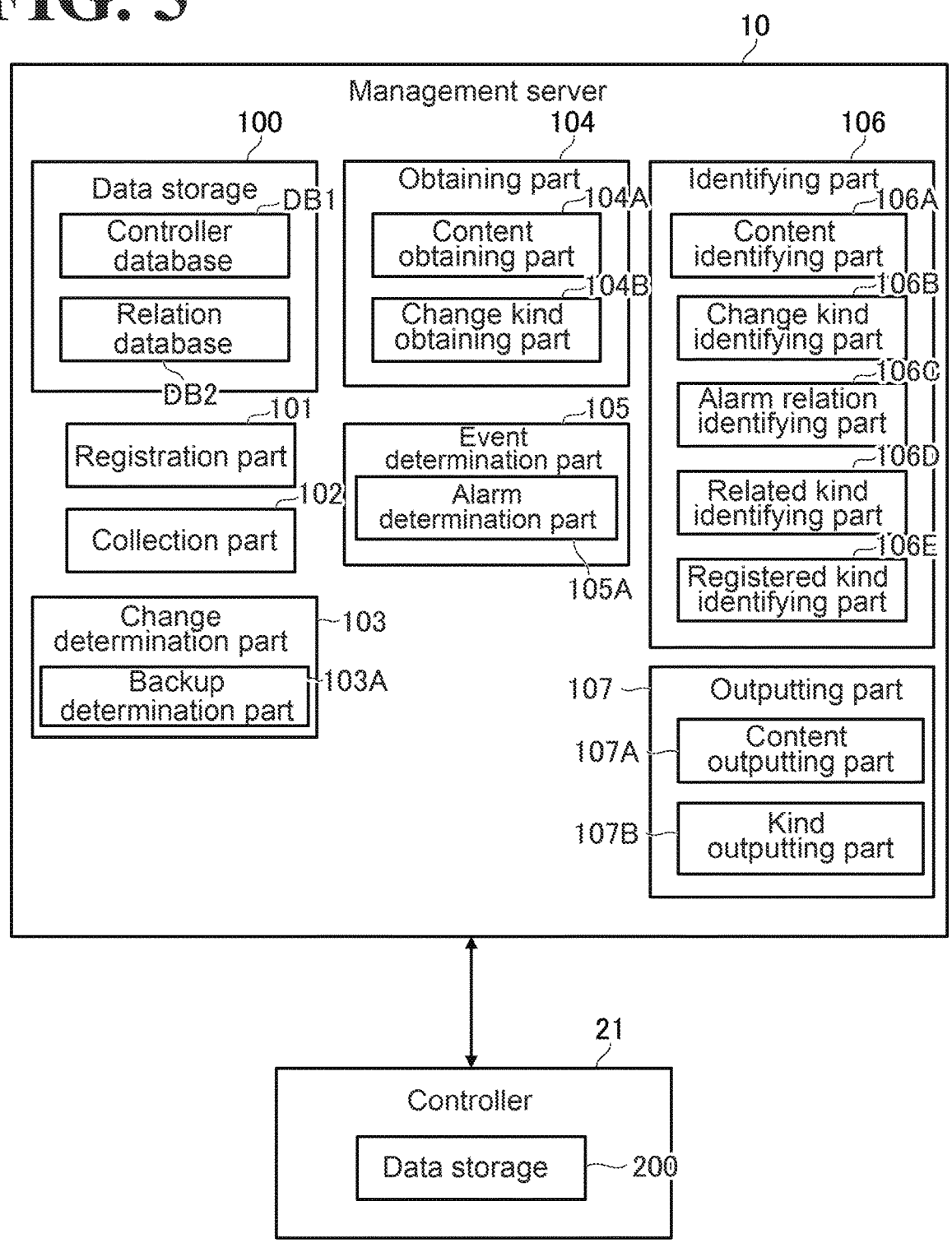
FIG. 5 is a functional block diagram of functions of the industrial machine management system.

FIG. 5 is a functional block diagram of functions of the industrial machine management system 1. The following description is regarding functions of the controller 21 and functions of the management server 10.

Functions of Controller

As illustrated in FIG. 5, the controller 21 includes a data storage 200. The data storage 200 is mainly implemented by the storage of the controller 21, and stores at least one setting data. It is to be noted that the number of setting data stored in the data storage 200 may be any number that is determined based on the purpose and application of the controller 21 and the robot 22. For example, when the controller 21 controls a plurality of robots 22, the data storage 200 stores setting data on an individual robot 22 basis.

The setting data stored in the data storage 200 may be changed by the worker operating the worker's terminal or by the user operating the user terminal 30. In this embodiment, a backup of the setting data is obtained periodically. Specifically, the management server 10 transmits a transmission command for the setting data to the controller 21, and in response, the controller 21 transmits the setting data stored in the data storage 200 to the management server 10. It is to be noted that the controller 21 may voluntarily transmit the setting data to the management server 10.

The data storage 200 stores alarm occurrence conditions. In this embodiment, the data storage 200 stores an alarm occurrence condition on an individual alarm code basis. An alarm occurrence condition may be any condition related to a motion status of the controller 21 or the robot 22. The method of detecting an alarm may be any method known in the art. For example, the controller 21 obtains a motion status of the robot 22 based on a detection signal detected by the sensor, and determines whether an alarm occurrence condition is met.

In one example, for an alarm related to torque abnormality, the controller 21 determines that the alarm occurrence condition is met when the peak value of a torque signal, the convergence value of the torque signal, the rising timing of the torque signal, or the convergence timing of the torque signal falls outside a reference range. In another example, for an alarm related to temperature abnormality, the controller 21 determines that the alarm occurrence condition is met when the value of temperature received from the temperature sensor falls outside a reference range. In another example, for an alarm related to speed abnormality, the controller 21 determines that the alarm occurrence condition is met when the value of speed received from the motor encoder or the motion sensor falls outside a reference range. Thus, the controller 21 determines whether an alarm occurrence condition is met based on information received from a sensor or based on a motion status of the controller 21.

When the controller 21 determines that any alarm occurrence condition is met, the controller 21 transmits an alarm occurrence notification to the management server 10. The alarm occurrence notification includes: the date and time of occurrence of the alarm; and the alarm code made to be related to the alarm occurrence condition. The date and time of occurrence of the alarm may be present date and time obtained from, for example, a real-time clock or a GPS signal. While this embodiment is regarding a case where the controller 21 determines whether an alarm has occurred, the management server 10 or another computer may determine whether an alarm has occurred.

Functions of Management Server

As illustrated in FIG. 5, the management server 10 includes a data storage 100, a registration part 101, a collection part 102, a change determination part 103, an obtaining part 104, an event determination part 105, an identifying part 106, and an outputting part 107. The data storage 100 is mainly implemented by the storage 12, and the other functions are mainly implemented by the CPU 11.

Data Storage

The data storage 100 stores data for managing the robot system 20. The data storage 100 stores a controller database DB1 and a relation database DB2. The controller database DB1 stores data regarding the controllers 21, and the relation database DB2 stores setting data registered in relation to alarms.

FIG. 6 illustrates an example of how data is stored in the controller database DB1. As illustrated in FIG. 6, the controller database DB1 stores names of the controllers 21, backup information, and occurring alarm information. It is to be noted that the information stored in the controller database DB1 will not be limited to the above-described information. For example, the controller database DB1 may store names of production lines to which the controllers 21 belong and/or trace data showing motion statuses of the robot 22 on a time-series basis. As used herein, the term "production line" refers to a work group in a facility. Controllers 21 belonging to an identical production line perform machining or processing, in turn, on objects conveyed by a conveyance device such as a belt conveyor. It will be assumed that information that a controller 21 belongs to a production line is defined in a database of the controller 21.

The backup information is information regarding backup of the setting data. Examples of the backup information include, but are not limited to, backup time of the setting data, real data of the setting data from which a backup was obtained, and changed-unchanged information regarding whether a change is made to the setting data. It is to be noted that the backup time of the setting data may be not only date but also time.

In this embodiment, the setting data stored in the controller database DB1 is setting data that is collected by the collection part 102, described later. In light of this, the data storage 100 stores, as a backup, the setting data collected by the collection part 102. Since a backup of the setting data is obtained repeatedly, the controller database DB1 stores a backup history of the setting data obtained in the past.

It is to be noted that old setting data may be automatically deleted so that only setting data corresponding to a predetermined recent period of time is stored or setting data corresponding to an n-th backup (n is natural number) is stored. In this embodiment, the setting data of all the controllers 21 are subjected to backup. Another possible example is that the setting data of some of the controllers 21 is subjected to backup. In this case, the determination as to whether a change has been made may be performed with respect to only those setting data that are subjected to backup.

When a change is made to the setting data, the changed-unchanged information shows a first value (a value corresponding to "change made" in FIG. 6). When no change is made to the setting data, the changed-unchanged information shows a second value (a value corresponding to "no change" in FIG. 6). Thus, the first value of the changed-unchanged information shows that a change in the setting data is detected at the corresponding backup time, while the second value of the changed-unchanged information shows that no change in the setting data is detected at the corresponding backup time. In the changed-unchanged information with the first value, a name(s) of the setting data that is changed is stored.

The occurring alarm information is information regarding an alarm that occurred in the controller 21. For example, the occurring alarm information stores: the date and time of occurrence of the alarm; and the alarm code of the alarm. In this embodiment, when an alarm occurs, the controller 21 transmits an alarm occurrence notification to the management server 10. Upon receipt of the alarm occurrence notification, the management server 10 obtains, from the alarm occurrence notification, the date and time of occurrence of the alarm and the alarm code of the alarm. Then, the management server 10 regards the date and time and the alarm code as occurring alarm information, and stores the occurring alarm information in the controller database DB1. It will be assumed that alarm codes in relation to alarm names are defined in advance in another database. The alarm name may not necessarily be included in the occurring alarm information.

FIG. 7 illustrates an example of how data are stored in the relation database DB2. As illustrated in FIG. 7, the relation database DB2 stores, on an individual controller 21 basis, alarm codes registered in relation to the setting data. The relation database DB2 may be common to all users or may show different registrations from user to user. For example, one user may register "Program A" and "Parameter B" in relation to the alarm of "001", while another user may register "Program C" in relation to the alarm of "001".

It is to be noted that the data stored in the data storage 100 will not be limited to the above-described data. In one example, the data storage 100 may store a database in which basic information of the user and the worker is stored. In another example, the data storage 100 may store data (for example, HTML data and/or image data) to be displayed on the registration screen G1, the alarm list screen G2, and the alarm detail screen G3.

Register

The registration part 101 registers, on an individual alarm code basis, kinds of setting data specified by the user. As used herein, the phrase "to register" refers to storing a kind of setting data (setting data kind) in the data storage 100; in this embodiment, the phrase refers to storing a setting data kind in the relation database DB2. While this embodiment is regarding a case where a setting data kind is registered on an individual alarm code basis, a setting data kind may not necessarily be registered on an individual alarm code basis. That is, a setting data kind common to a plurality of alarm codes may be registered as related setting data.

In this embodiment, since an alarm is equivalent to an event, an alarm code is equivalent to an event kind. Names of event kinds vary from event to event, and an alarm name may be regarded as being equivalent to an event. In another example, when degradation of performance is equivalent to an event, the kind of the performance degraded may be equivalent to an event kind. Examples of the event kind include, but are not limited to, shortened service life, shortened tact time, and degradation in quality of the object worked on.

In another example, when falling of a motion status outside a reference range is equivalent to an event, the kind of the motion status falling outside the reference range may be equivalent to an event kind. In another example, when the following items fall outside respective reference ranges, each falling may be equivalent to an event kind: the waveform of a torque signal, maximum torque, a convergence value of a torque signal, the rising timing of the torque signal, the convergence timing the torque signal, position information regarding the position of a motor, speed information regarding the speed of the motor, the amount of overshoot, settling time, tact time, cycle time, CPU usage, memory usage, and communication traffic.

In this embodiment, the user specifies on the registration screen G1 setting data related to alarms. Then, the registration part 101 registers, in the relation database DB2, the setting data specified by the user. Specifically, the registration part 101 relates an alarm code with a kind of setting data specified on pull-down menu M10, M11, or M12, and stores the resulting relation in the relation database DB2. More specifically, the registration part 101 receives from the user terminal 30 a combination of an alarm code and a setting data kind specified by the user, and stores the combination in the relation database DB2.

Collection Part

The collection part 102 collects changeable setting data from the controller 21. As used herein, the term "to collect" refers to obtain or receive data from the controller 21. The collection part 102 collects the setting data at each time point of a plurality of time points. In other words, the collection part 102 repeatedly collects the setting data. The collection part 102 may collect the setting data periodically or non-periodically. A possible example of when the collection part 102 collects the setting data non-periodically is that when an alarm occurs. Another possible example is when the user instructs collection of the setting data.

This embodiment is regarding a case where the controller 21 uploads the setting data at a demand from the management server 10, instead of uploading the setting data voluntarily. In response to the demand from the management server 10, the collection part 102 makes a demand to the controller 21 for the setting data. In response to the demand, the controller 21 transmits the setting data to the collection part 102. In this manner, the collection part 102 collects the setting data. When the robot system 20 includes a plurality of controllers 21, the collection part 102 collects the setting data from each of the plurality of controllers 21.

The collection part 102 collects the setting data when a predetermined condition is met. The predetermined condition may be any condition specified for collection of the setting data. In this embodiment, one predetermined condition is that backup time has come. Another possible example is that an alarm occurs in the controller 21. Another possible example is that trace data of a torque signal associated with the robot 22 has turned into a predetermined state. Another possible example is that the user or the worker has made a command for a backup.

The backup time may be stored in advance in the data storage 100, and any point of time may be set as the backup time. In one example, the backup time may be the same point of time daily or may vary from week to week. It is to be noted that a backup may not necessarily be obtained daily; for example, a backup may be scheduled to be obtained at time intervals of a few to several days or may be scheduled to be obtained in business days on which the factor operates.

The collection part 102 obtains knowledge of the present date and time using a real-time clock, a GPS signal, or similar means, and determines whether predetermined backup time has come. When the collection part 102 determines that the predetermined backup time has come, the collection part 102 makes a demand to the controller 21 for the setting data. It is to be noted that the backup time may be set to be common to all the controllers 21 or may be set to vary from controller 21 to controller 21. Upon collecting the setting data from the controller 21, the collection part 102 stores the setting data in the controller database DB as a backup.

Change Determination Part

Based on the setting data at each time point of the plurality of time points, the change determination part 103 determines whether a change has been made to the setting data. Specifically, the change determination part 103 compares the setting data collected at a first time point with the setting data collected at a second time point different from the first time point. Based on the comparison, the change determination part 103 determines whether a change has been made to the setting data. In other words, when the setting data is collected by the collection part 101, the change determination part 103 compares the collected setting data with the setting data collected at an earlier point of time. Based on the comparison, the change determination part 103 determines whether a change has been made to the setting data. When the change determination part 103 determines that a change is made to the setting data, the change determination part 103 stores a first value and the name of the changed setting data in the changed-unchanged information. When the change determination part 103 determines that no change is made to the setting data, the change determination part 103 stores a second value in the changed-unchanged information.

This embodiment is regarding a case where the setting data is determined as being changed regardless of whether the change made to the setting data is a major or minor change (that is, the setting data is determined as being changed even if the setting data is changed only partially). In one example, when the latest program code and the previous program code match completely, the change determination part 103 determines that no program change has been made, while when the latest program code and the previous program code do not match completely, the change determination part 103 determines that a program change has been made. In another example, when a new program is added to the setting data or an existing program in the setting data is deleted, the change determination part 103 determines that a program change has been made. In another example, when the latest parameter value(s) and the previous parameter value(s) match completely, the change determination part 103 determines that no parameter change has been made, while when the latest parameter value(s) and the previous parameter value(s) do not match completely, the change determination part 103 determines that a parameter change has been made. In another example, when a new parameter is added to the setting data or an existing parameter in the setting data is deleted, the change determination part 103 determines that a parameter change has been made.

It is to be noted that it is possible to determine that no change has been made to the setting data when a predetermined change is not made to the setting data. Examples of the predetermined change include a change made to a particular command in a program (such as a movement command and a wait command), and a change made to a particular parameter (such as output torque and motor speed). Other examples of the predetermined change include a situation in which the amount by which a variable in a program changed is equal to or higher than a threshold, and a situation in which the amount by which a parameter changed is equal to or higher than a threshold.

In this embodiment, the change determination part 103 determines, at every backup time, whether a change has been made to the setting data. For this purpose, the change determination part 103 includes a backup determination part 103A. The backup determination part 103A determines, based on setting data collected for backup purposes, whether a change has been made to the setting data. Specifically, when the collection part 102 has collected backup target setting data, the backup determination part 103A compares the backup target setting data with backup target setting data obtained at an earlier point of time, and based on the comparison, determines whether a change has been made to the setting data. It is to be noted that the backup determination part 103A may perform the above determination after the setting data is stored into the controller database DB1 (that is, after a backup is completed), or may perform the above determination after before the setting data is stored into the controller database DB1 (that is, before a backup is completed).

Obtaining Part

When the change determination part 103 determines that a change is made to the setting data, the obtaining part 104 outputs change information. The change information is regarding the change made to the setting data. The change information may be any information insofar as the information is regarding the change made to the setting data. Examples of the change information include, but are not limited to: change detail information, which is regarding a detail of the change made to the setting data; and change kind information, which is regarding a kind of the setting data to which the change is made. Other examples of the change information include: the point of time at which the change was made to the setting data; the fact that the change is made to the setting data; the person who made the change to the setting data; the controller 21 whose setting data is changed; and the robot 22 that operates based on the changed setting data.

In this embodiment, the change content information is displayed on the alarm detail screen G3. For this purpose, the obtaining part 104 includes a content obtaining part 104A. The content obtaining part 104A obtains the change content information. When the change determination part 103 determines that a change is made to the setting data, the content obtaining part 104A obtains, as the change information, change content information regarding content of the change made to the setting data. Specifically, the content obtaining part 104A obtains the change content information based on pre-change setting data and post-change setting data. After obtaining the change content information, the content obtaining part 104A may store the change content information in the controller database DB1.

The change detail information is information regarding a detail of the change made to the setting data. The detail of the change may be a position on the setting data to which the change was made, or may be a part of the setting data to which the change was made. In one example, when a change is made to a program, the change detail information denotes a program code that has been added, changed, or deleted. In another example, when a change is made to a parameter, the change detail information denotes the amount of the change made to the parameter. It is to be noted that when the setting data is a parameter file in which a plurality of parameters are stored, the change detail information may denote the parameter in the parameter file to which the change is made. In one example, when a plurality of kinds of parameters are stored in a parameter file, the change detail information may denote the kind of the parameter in the parameter file to which the change is made. In another example, when values of a parameter are stored in time order in a parameter file, the change detail information may denote the point of time in the parameter file at which the change was made to the parameter.

Also in this embodiment, the change kind information is displayed on the alarm detail screen G3. For this purpose, the obtaining part 104 includes a change kind obtaining part 104B. The change kind obtaining part 104B obtains the change kind information. In the controller 21, a plurality of kinds of setting data are changeable. When the change determination part 103 determines that a change is made to the setting data, the change kind obtaining part 104B obtains, as the change information, change kind information regarding the kind of the setting data to which the change is made. After obtaining the change kind information, the change kind obtaining part 104B may store the change kind information in the controller database DB1.

The change kind information is information regarding the kind of the setting data to which a change is made. In one example, when a change is made to a program, the change kind information denotes the name of the program (file name of the program) to which the changed is made. In another example, when a change is made to a parameter, the change kind information denotes the name of the parameter (file name of the parameter) to which the changed is made. It is to be noted that the kind(s) of the setting data may be identified by other identification information such as ID.

Event Determination Part

The event determination part 105 determines whether a predetermined event has occurred in the controller 21. Specifically, the controller 21 first determines whether an event has occurred in the controller 21, and when the event occurs, the controller 21 transmits a predetermined notification to the event determination part 105. Thus, the event determination part 105 determines whether the predetermined notification has been received from the controller 21. It is to be noted that the controller 21 may not necessarily determine whether an event has occurred in the controller 21; in this case, the event determination part 105 may receive a motion status of the controller 21 or the robot 22, and determine whether the motion status meets an occurrence condition for the event.

In this embodiment, an alarm is equivalent to an event. For this reason, the event determination part 105 includes an alarm determination part 105A. The alarm determination part 105A determines whether an alarm has occurred as an event in the controller 21. Specifically, when an alarm occurs, the controller 21 transmits to the management server 10 an alarm occurrence notification including the date and time of occurrence of the alarm and the alarm code. Then, the alarm determination part 105A determines whether the alarm has occurred by determining whether the alarm occurrence notification has been received. When the alarm occurrence notification is received, the alarm determination part 105A determines that the alarm occurs. When no alarm occurrence notification is received, the alarm determination part 105A determines that no alarm occurs.

While this embodiment is regarding a case where the controller 21 determines whether the alarm occurrence condition is met, it is possible for the management server 10 to receive from the controller 21 a motion status of the controller 21 or the robot 22 and for the alarm determination part 105A to determine, based on the motion status that is received, whether the alarm occurrence condition is met. In this case, when the alarm determination part 105A determines that the alarm occurrence condition is met, the alarm determination part 105A determines that the alarm occurs. When the alarm determination part 105A determines that the alarm occurrence condition is not met, the alarm determination part 105A determines that no alarm occurs.

When degradation of performance is equivalent to an event, the event determination part 105 receives information regarding performance from the controller 21, and determines whether the performance indicated by the information is outside a reference range. Examples of the information regarding performance include, but are not limited to, lifetime, load ratio, and tact time associated with a component of the robot 22. The determination as to degradation of performance may be made on the side of the controller 21, and the event determination part 105 may only receive the determination made by the controller 21.

When a situation in which a motion status falls outside a reference range is equivalent to an event, the event determination part 105 receives information regarding the motion status from the controller 21, and determines whether the motion status indicated by the information is outside a reference range. Examples of the information regarding a motion status include, but are not limited to: trace data, which shows information on a time-series basis; and information as of a point of time, such as a torque signal value and a speed value. The determination as to whether a motion status is outside a reference range may be made on the side of the controller 21, and the event determination part 105 may only receive the determination made by the controller 21.

Identifying Part

When the event determination part 105 determines that an event occurs, the identifying part 106 identifies change information related to the event. In this embodiment, since the relation database DB2 shows events in relation to setting data, the identifying part 106 identifies, from the relation database DB2, change information regarding a piece of setting data made to be related to the event that occurs. For example, from change information obtained in the past, the identifying part 106 identifies change information closest to the time at which the event occurred.

The identifying part 106 may identify one piece of change information closest to the time at which the event occurred, or may identify a predetermined number of pieces of change information arranged in decreasing order of closeness to the time at which the event occurred. That is, the identifying part 106 may identify any number of pieces of change information. Specifically, the identifying part 106 may identify one piece of change information (as in this embodiment) or may identify two, three, four, or more pieces of change information.

The change information identified by the identifying part 106 is such change information that should be output by the outputting part 107 among change information obtained in the past. Under the circumstances, the identifying part 106 narrows down the change information obtained in the past to change information that should be output by the outputting part 107. In other words, from change information of setting data that were changed within a period of time starting from the time at which the event occurred point, the identifying part 106 extracts change information that should be output by the outputting part 107.

In this embodiment, the identifying part 106 identifies change information regarding setting data related to an alarm, and does not identify change information regarding setting data unrelated to the alarm. If, therefore, the time at which setting data unrelated to an alarm was changed is closer to the time at which an alarm occurred than the time at which setting data related to an alarm was changed is to the time at which the alarm occurred, the identifying part 106 does not identify the change information regarding setting data unrelated to the alarm but identifies the change information regarding setting data related to the alarm.

In the data storage examples illustrated in FIGS. 6 and 7, the alarm of "003" occurred in "Controller X" at 10:25:08 on Jan. 16, 2019. Setting data changes that were made at time closest to the time at which the alarm of "003" occurred are changes to "Program A" and "Parameter B", which were detected at backup time of Jan. 15, 2019. The setting data "Program A" and "Parameter B", however, are unrelated to the alarm and thus are not identified by the identifying part 106. Instead, the identifying part 106 identifies change information regarding "Program C", which was detected at backup time of Jan. 11, 2019.

In this embodiment, the change content information is displayed on the alarm detail screen G3. For this purpose, the identifying part 106 includes a content identifying part 106A. The content identifying part 106A identifies the change content information. When the event determination part 105 determines that an event occurs, the content identifying part 106A identifies change content information related to the event. For example, from change content information obtained in the past, the content identifying part 106A identifies change content information closest to the time at which the event occurred. The content identifying part 106A identifies a predetermined number of pieces of change content information arranged in decreasing order of closeness to the time at which the event occurred. The content identifying part 106A identifies change content information regarding setting data related to the event, and does not identify change content information regarding setting data unrelated to the event.

In this embodiment, the change kind information is displayed on the alarm detail screen G3. For this purpose, the identifying part 106 includes a change kind identifying part 106B. The change kind identifying part 106B identifies the change kind information. When the event determination part 105 determines that an event occurs, the change kind identifying part 106B identifies change kind information related to the event. For example, from change kind information obtained in the past, the change kind identifying part 106B identifies change kind information closest to the time at which the event occurred. The change kind identifying part 106B identifies a predetermined number of pieces of change kind information arranged in decreasing order of closeness to the time at which the event occurred. The change kind identifying part 106B identifies change kind information regarding setting data related to the event, and does not identify change kind information regarding setting data unrelated to the event.

In this embodiment, an alarm is equivalent to an event. For this reason, the identifying part 106 includes an alarm relation identifying part 106C. When the alarm determination part 105A has determined whether an alarm has occurred, the relation identifying part 106C identifies change information related to the alarm. In this embodiment, since the relation database DB2 shows alarms in relation to setting data, the alarm relation identifying part 1060 identifies, from the relation database DB2, change information regarding a piece of setting data made to be related to the alarm that occurs. For example, from change information obtained in the past, the alarm relation identifying part 106C identifies change information closest to the time at which the alarm occurred. The alarm relation identifying part 106 identifies a predetermined number of pieces of change information arranged in decreasing order of closeness to the time at which the alarm occurred. The alarm relation identifying part 106C identifies change information regarding setting data related to the alarm, and does not identify change information regarding setting data unrelated to the alarm.

In this embodiment, a plurality of kinds of setting data are changeable in the controller 21, and a plurality of kinds of events are occurrable in the controller 21. For this reason, the identifying part 106 includes a related kind identifying part 106D. When one kind of event among a plurality of kinds of events is determined as occurring, the related kind identifying part 106D identifies change information of a kind of setting data related to the one kind of event. In this embodiment, since the relation database DB2 shows event kinds in relation to setting data, the related kind identifying part 106D identifies, from the relation database DB2, change information of setting data made to be related to the kind of event that occurs, and does not identify change information of setting data that is not made to be related to the kind of event that occurred.

In this embodiment, a kind of setting data related to a kind of event is registered by the user. For this reason, the identifying part 106 includes a registered kind identifying part 106E. When the kind of event, among the plurality of kinds of events, is determined as occurring, the registered kind identifying part 106E identifies, based on the registered content registered by the registration part 101, change information of the kind of setting data related to the kind of event. Since the kind of setting data registered by the registration part 101 is specified by the user, the registered kind identifying part 106E identifies change information of the kind of setting data specified by the user, and does not identify change information of a kind of setting data that is not specified by the user.

Outputting Part

The outputting part 107 outputs the change information identified by the identifying part 106. While this embodiment is regarding a case where the change information output onto screen in a visually recognizable manner, the change information may be output in the form of sound or data (file output). When the change information is output in the form of data output, the change information is output to and recorded in an external device or a memory in the form of data. In this case, the change information may be output in any data form, examples including, but not limited to, image form, text form, document form, tabular form, csv form, and message form. Another possible example that a message including the change information may be sent, which may be regarded as an output of the change information.

In this embodiment, the change content information is displayed on the alarm detail screen G3. For this purpose, the outputting part 107 includes a content outputting part 107A. The content outputting part 107A outputs the change content information identified by the content identifying part 106A. Specifically, the content outputting part 107A outputs the change content information such that the change content information shows a difference between setting data. While this embodiment is regarding a case where all of the difference is obtained as the change content information, only part of the difference may be obtained as the change content information.

In one example, the content outputting part 107A outputs the change content information such that the change content information shows a discrepancy between a character string of a program code of a pre-change program and a character string of a program code of a post-change program. In another example, the content outputting part 107A outputs the change content information such that the change content information shows a difference between a pre-change parameter value and a post-change parameter value. In this embodiment, the content outputting part 107A displays, on the alarm detail screen G3, content of a change made to a program code and/or content of a change made to a parameter.

Also in this embodiment, the change kind information is displayed on the alarm detail screen G3. For this purpose, the outputting part 107 includes a kind outputting part 107B. The kind outputting part 107B outputs the change kind information identified by the change kind identifying part 106B. The change determination part 103 is capable of determining, on an individual setting data kind basis, whether a change has been made to the setting data. When the change determination part 103 makes such determination, the kind outputting part 107B outputs the change kind information such that the change kind information denotes the kind of the setting data that the change determination part 103 determines as being changed. For example, the kind outputting part 107B outputs, as the change kind information, the name of a program that the change determination part 103 determines as being changed. In this embodiment, the kind outputting part 107B displays, on the alarm detail screen G3, the name of the program that is changed.

4. Processings Performed in Industrial Machine Management System

Processings performed in the industrial machine management system 1 will be described. The following description is regarding registration processing for registering related setting data, backup processing of obtaining a backup of setting data, and alarm occurrence processing performed when an alarm occurs. These processings are example processings performed by the functional blocks illustrated in FIG. 5.

Registration Processing

Figure 8:
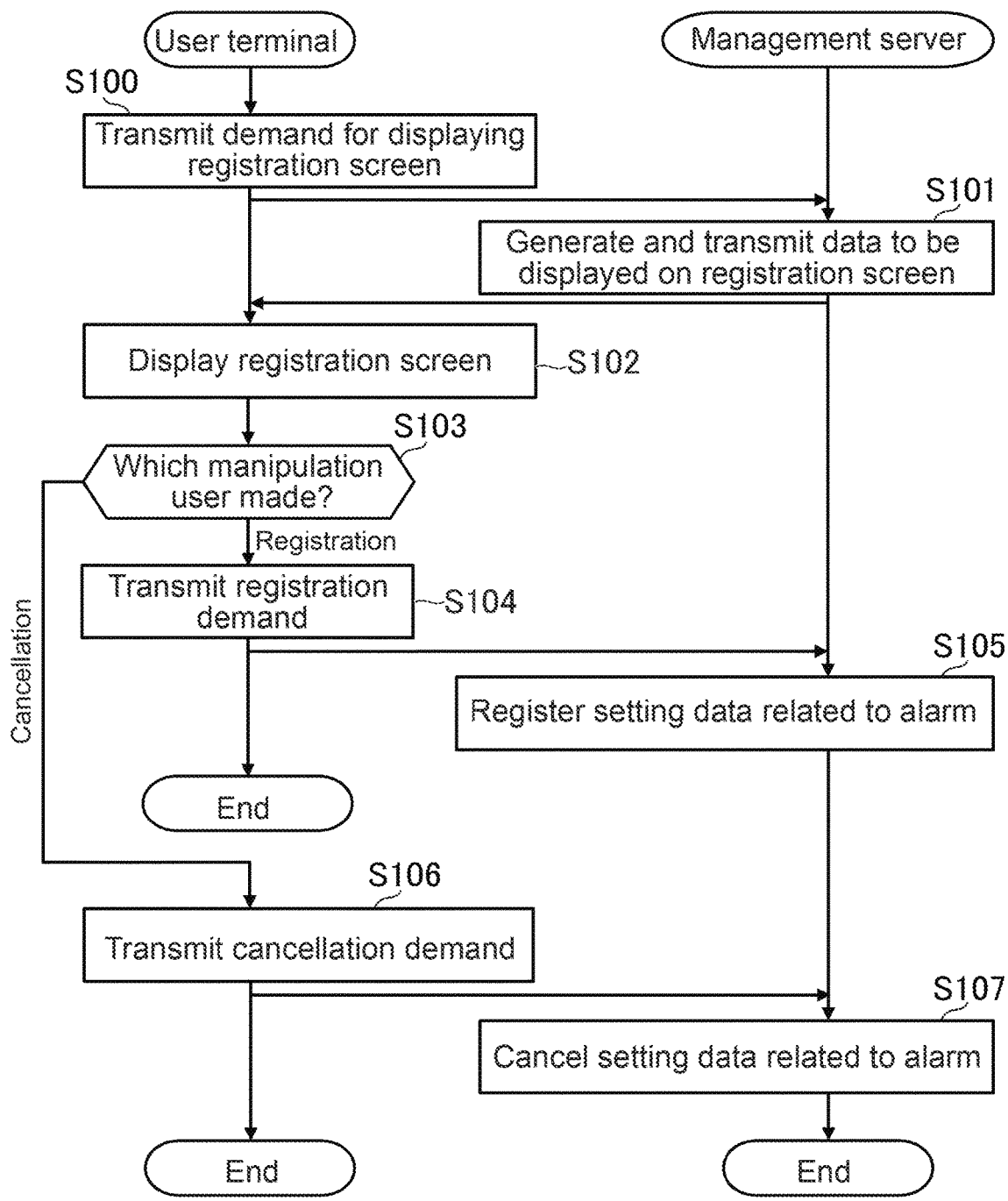
FIG. 8 is a flow chart of registration processing.

FIG. 8 is a flow chart of the registration processing. The screen display processing illustrated in FIG. 8 is performed by: the CPU 11 of the management server 10 when the CPU 11 operates according to a program stored in the storage 12; and the CPU 31 of the user terminal 30 when CPU 31 operates according to a program stored in the storage 32.

As illustrated in FIG. 8, the CPU 31 of the user terminal 30 transmits to the management server 10 a demand for displaying the registration screen G1 (S100). The demand for displaying the registration screen G1 may be made by transmitting predetermined form data. In one example, when the registration screen G1 is displayed on a web browser, the demand may contain a universal resource locator (URL). In another example, when the registration screen G1 is displayed on an application, the demand may contain identification information of the registration screen G1. The same applies in the demands for displaying the other screens, described later. It will be assumed that the demand for displaying transmitted at S100 includes the name of the registration target controller 21.

Upon receipt of the demand for displaying the registration screen G1, the CPU 11 of the management server 10 generates, based on the controller database DB1 and the relation database DB2, data to be displayed on the registration screen G1, and transmits the data to the user terminal 30 (S101). At S101, the CPU 11 refers to the backup information stored in the controller database DB1 and identifies kinds of the setting data stored in the registration target controller 21. Then, the CPU 11 sets the kinds of setting data to be shown on pull-down menus M10 to M12. Then, the CPU 11 refers to the relation database DB2 and identifies relationships between alarm codes and related setting data, and determines items to be displayed on the registration screen G1. The items are alarm code, alarm name, and kinds of setting data registered at the present time.

Upon receipt of the data to be displayed on the registration screen G1, the CPU 31 of the user terminal 30 causes the display 35 to display the registration screen G1 based on the data that is received (S102). The CPU 31 receives a detection signal from the operation part 34 and, based on the detection signal, identifies the user's manipulation of the operation part 34 (S103). It will be assumed that the manipulation at S103 is either registration manipulation of registering related setting data or cancellation manipulation of canceling registered setting data.

When the manipulation at S103 is registration manipulation of registering related setting data (S103: registration manipulation), the CPU 31 transmits a registration demand for registration of related setting data (S104). The registration demand may be made by transmitting a predetermined form of data, and includes, for example, an alarm code and a setting data name specified by the user.

Upon receipt of the registration demand, the CPU 11 of the management server 10 registers the setting data specified by the user as setting data related to the alarm having the alarm code specified by the user (S105), thus ending this processing. At S105, the CPU 11 mutually relates the alarm code and the setting data included in the registration demand, and stores the alarm code and the setting data in the relation database DB2.

When the manipulation at S103 is cancellation manipulation of canceling related setting data (S103: cancellation manipulation), the CPU 31 transmits a cancellation demand for canceling, from the alarm code, related setting data specified by the user (S106). The cancellation demand may be made by transmitting a predetermined form of data, and includes, for example, an alarm code and a setting data name specified by the user.

Upon receipt of the cancellation demand, the CPU 11 of the management server 10 cancels the setting data specified by the user from the alarm having the alarm code specified by the user (S107), thus ending this processing. At S107, the CPU 11 updates the relation database DB2 such that the relation between the alarm code and the setting data included in the cancellation demand is canceled.

Backup Processing

Figure 9:
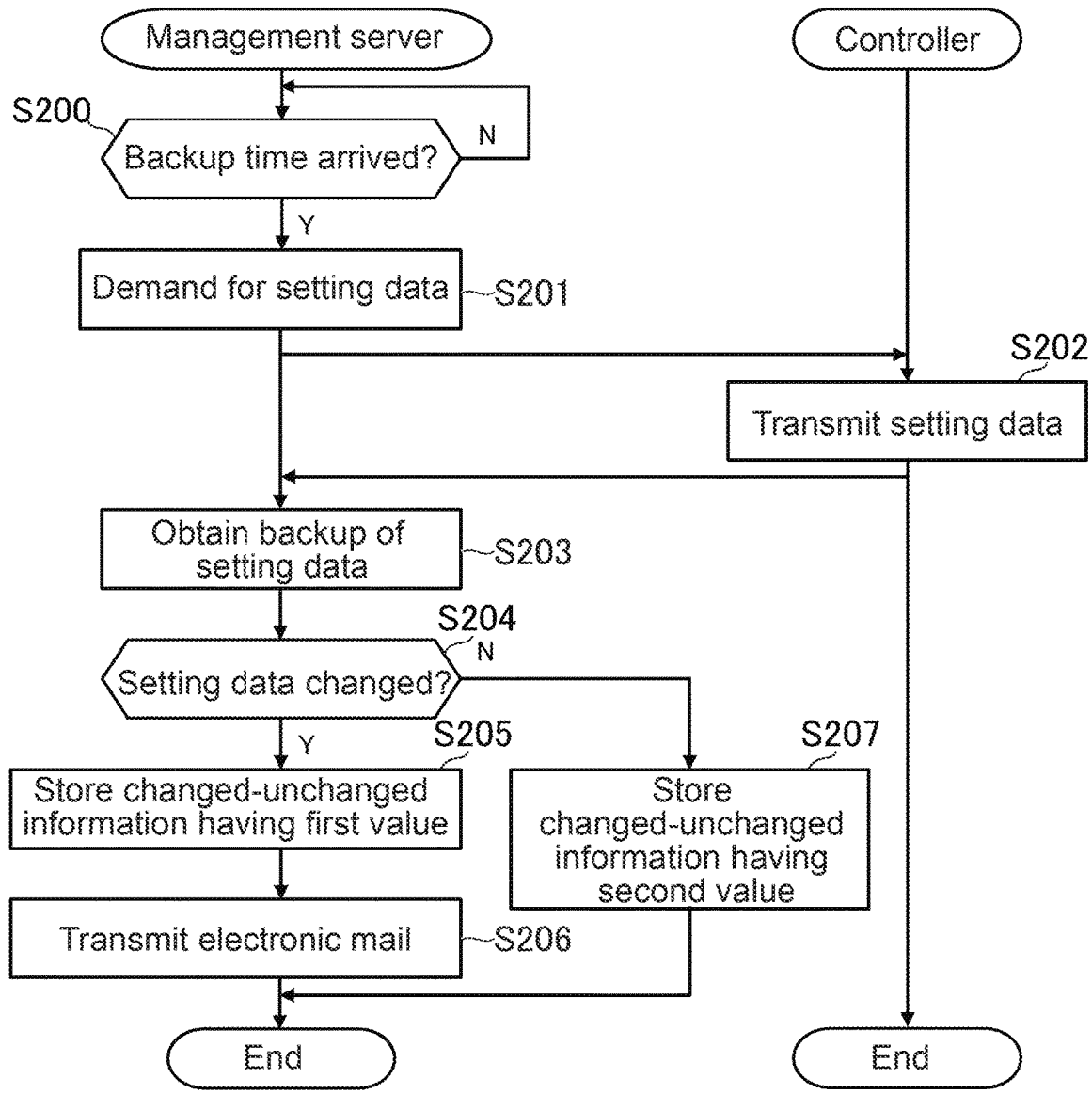
FIG. 9 is a flow chart of backup processing.

FIG. 9 is a flow chart of the backup processing performed in this embodiment. The backup processing illustrated in FIG. 9 is performed by: the CPU 11 of the management server 10 when the CPU 11 operates according to a program stored in the storage 12; and the controller 21 when the controller 21 operates according to a program stored in the controller 21.

As illustrated in FIG. 9, the CPU 11 of the management server 10 obtains knowledge of the present date and time using a real-time clock, a GPS signal, or similar means, and determines whether backup time has come (S200). It will be assumed that the backup time is stored in advance in the storage 12. When the CPU 11 has determined the backup time has not come yet (S200: N), the processing at S200 is performed again.

When the CPU 11 determines that the backup time has come (S200: Y), the CPU 11 makes a demand to the controller 21 for the setting data (S201). The demand for the setting data may be made by transmitting predetermined form data. When there are a plurality of controllers 21, the CPU 11 makes a demand to each of the controllers 21 for the setting data at S201. It is to be noted that all the controllers 21 may not necessarily be regarded as backup targets; some of the controllers 21 may be regarded as backup targets.

Upon receipt of the demand for the setting data, the controller 21 transmits setting data stored in a storage of the controller 21 (S202). At S202, the controller 21 transmits all the backup target setting data together with information for identifying the controller 21 (for example, the name of the controller 21). It is to be noted that the backup target may not necessarily be all the setting data stored in the controller 21; some of the setting data may be regarded as the backup target.

Upon receipt of the set data from the controller 21, the CPU 11 of the management server 10 stores the setting data into the controller database DB1 and obtains a backup of the setting data (S203). At S203, the CPU 11 stores the setting data by relating the setting data with the name of the controller 21 from which the setting data is transmitted, and obtains a backup of such setting data. In this respect, the CPU 11 stores the present date and time as backup date and time.

The CPU 11 compares the setting data received at S203 (the latest backup of setting data) with a past backup of setting data (the most previous or earlier backup of setting data), and based on the comparison, determines whether a change has been made to the setting data (S204). At S204, the CPU 11 determines whether program codes or parameter values match. This embodiment is regarding a case where the determination at S204 is "Yes" when a change is made to at least one piece of the setting data. Another possible example is that the determination at S204 is "Yes" when a change is made to a particular piece of the setting data. Still another possible example is that the determination at S204 is "Yes" when the number of the setting data that is changed is outside a reference range.

When the CPU 11 determines that a change is made to the setting data (S204: Y), the CPU 11 stores changed-unchanged information having a first value into the controller database DB1 (S205). Then, the CPU 11 transmits an electronic mail (S206) to the user, thus ending the processing. At S205, the CPU 11 sets a first value in the changed-unchanged information of the controller 21 from which the setting data is transmitted. Then, the CPU 11 stores the name of the changed setting data. It is to be noted that at this time of the processing, the CPU 11 may obtain the change content information and the change kind information and include the change content information and the change kind information in the changed-unchanged information. At S206, the CPU 11 transmits an electronic mail to a predetermined mail address. The destination of the electronic mail may be specified on an individual controller 21 basis.

When the CPU 11 determines that no change is made to the setting data (S204: N), the CPU 11 stores changed-unchanged information having a second value into the controller database DB1 (S207), thus ending the processing. At S207, the CPU 11 sets a second value in the changed-unchanged information of the controller 21 from which the setting data is transmitted. In this case, since no change has been made to the setting data, no electronic mail is sent.

Alarm Occurrence Processing

Figure 10:
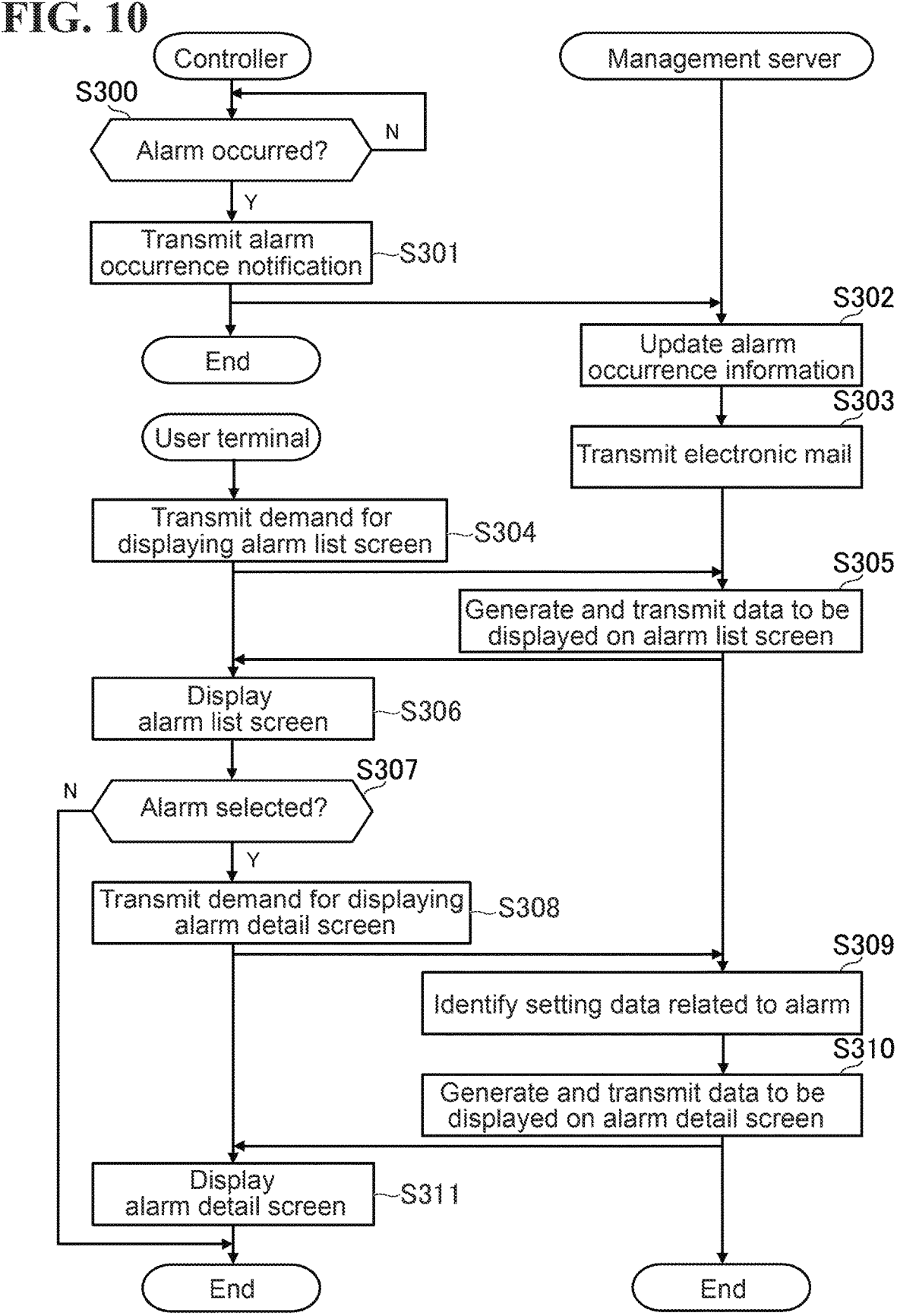
FIG. 10 is a flow chart of alarm occurrence processing.

FIG. 10 is a flow chart of alarm occurrence processing. The alarm occurrence processing illustrated in FIG. 10 is performed by: the CPU 11 of the management server 10 when the CPU 11 operates according to a program stored in the storage 12; the controller 21 when the controller 21 operates according to a program stored in the storage of the controller 21; and the CPU 31 of the user terminal 30 when the CPU 31 operates according to a program stored in the storage 32.

As illustrated in FIG. 10, first, the controller 21 determines whether an alarm has occurred (S300). At S300, based on a motion status of the controller 21 or the robot 22, the controller 21 determines whether an alarm occurrence condition is met. Details of this determination processing are as described above.

When the controller 21 determines that an alarm occurs (S300: Y), the controller 21 transmits an alarm occurrence notification to the management server 10. The alarm occurrence notification shows that an alarm occurs (S301). At S301, the controller 21 transmits the alarm occurrence notification such that the alarm occurrence notification includes: the alarm occurrence date and time, which are the present date and time; and the alarm code indicated by the alarm occurrence condition that is met.

Upon receipt of the alarm occurrence notification, the CPU 11 of the management server 10 updates the alarm occurrence information included in the controller database DB1 (S302), and transmits an electronic mail to the user (S303). At S302, the CPU 11 stores, in the controller database DB1, the alarm occurrence information such that the alarm occurrence information includes the alarm occurrence date and time and the alarm code, which are included in the alarm occurrence notification. At S303, the CPU 11 prepares an electronic mail notifying that an alarm occurs, and transmits the electronic mail to the address of the user. The electronic mail may include: the name of the controller 21 in which the alarm occurs; alarm code; alarm name; alarm occurrence time; and a hyperlink to the alarm list screen G2. The destination of the electronic mail may be specified on an individual controller 21 basis.

The CPU 31 of the user terminal 30 transmits a demand for displaying the alarm list screen G2 (S304). Upon receipt of the demand for displaying the alarm list screen G2, the CPU 11 of the management server 10 generates, based on the controller database DB1, data to be displayed on the alarm list screen G2, and transmits the data to the user terminal 30 (S305). At S305, the CPU 11 refers to the occurring alarm information included in the controller database DB1; identifies the controller 21 in which the alarm occurs, alarm occurrence time, alarm code, and alarm name; and generates data to be displayed on the alarm list screen G2.

Upon receipt of the data to be displayed on the alarm list screen G2, the CPU 31 of the user terminal 30 causes the display 35 to display the alarm list screen G2 based on the received data (S306). The CPU 31 receives a detection signal from the operation part 34 and, based on the detection signal, determines whether an alarm displayed on the alarm list screen G2 has been selected (S307).

When the CPU 31 determines that an alarm has been selected (S307: Y), the CPU 31 transmits a demand for displaying details of the selected alarm on the alarm detail screen G3 (S308). It will be assumed that the demand for displaying includes: the name of the controller 21 in which the alarm selected by the user occurs; alarm occurrence time; alarm code; and alarm name.

Upon receipt of the demand for displaying the alarm detail screen G3, the CPU 11 of the management server 10 identifies, based on the relation database DB2, setting data related to the alarm specified by the user (S309). Then, based on the controller database DB1, the CPU 11 generates data to be displayed on the alarm detail screen G3, and transmits the data to the user terminal 30 (S310). At S309, the CPU 11 refers to the relation database DB2 and identifies the setting data made to related to the name of the controller 21 and the alarm code that are included in the demand for displaying. At S310, the CPU 11 refers to the controller database DB1; obtains a present version of the identified setting data as of the alarm occurrence time and a previous version of the identified setting data that is one version previous to the present version; and generates data to be displayed on the alarm detail screen G3.

Upon receipt of the data to be displayed on the alarm detail screen G3, the CPU 31 of the user terminal 30 causes the display 35 to display the alarm detail screen G3 based on the received data (S311), thus ending the processing.

As has been described hereinbefore, when the industrial machine management system 1 determines that a change has been made to the setting data of the controller 21, the industrial machine management system 1 obtains change information regarding the change. When a predetermined event is determined as occurring in the controller 21, the industrial machine management system 1 identifies and outputs change information related to the predetermined event. Thus, the industrial machine management system 1 provides information useful for an analysis for what caused the predetermined event in the controller 21, thus assisting the user in the user's analysis for what caused the predetermined event. For example, if someone has changed the setting data without the user's knowing, causing a predetermined event to occur, the user is able to obtain knowledge of change information related to the predetermined event. Thus, the industrial machine management system 1 effectively assists the user in the user's analysis for what caused the predetermined event.

Also, when the management server 10 determines that a predetermined event occurs in the controller 21, the management server 10 identifies and outputs change content information related to the event that occurs. This makes the user readily aware of which changes have been made to which parts of the setting data and aware of which of the changes has caused the predetermined event. Thus, the management server 10 effectively assists the user in the user's analysis for what caused the predetermined event to occur in the controller 21. For example, when a predetermined event (such as an alarm) occurs in the controller 21, it is possible that the event has something to do with a change made to a particular position on the setting data. In light of this, outputting the change content information effectively assists the user in the user's analysis for the cause of the event.

Also, when the management server 10 determines that a predetermined event occurs in the controller 21, the management server 10 identifies and outputs change kind information related to the event that occurs. This makes the user readily aware of which changes have been made to which kinds of setting data and aware of which of the changes has caused the predetermined event. Thus, the management server 10 effectively assists the user in the user's analysis for what caused the predetermined event to occur in the controller 21. For example, when a predetermined event (such as an alarm) occurs in the controller 21, it is possible that the event has something to do with a change made to a particular kind of the setting data. In light of this, outputting the change kind information effectively assists the user in the user's analysis for the cause of the event.

Also, when an alarm occurs in the controller 21, there is a case where a change made to the setting data of the controller 21 has something to do with the alarm. In light of this, outputting change information effectively assists the user in the user's analysis for the cause of the alarm.

Also, the kinds of events occurrable in the controller 21 may be caused by different kinds of setting data. In light of this, when a kind of event occurs in the controller 21, change information of the kind of setting data related to the kind of event is identified and output. Thus, change information that is based on the kind of event that occurs is provided. This effectively assists the user in the user's analysis for what caused the event.

Also, for each of the plurality of kinds of events, a kind of setting data that has been specified by a user is registered. This enables the user himself/herself to specify the kind of setting data related to the kind of event that occurs in the controller 21. Thus, the user is able to, on an individual event kind basis, specify a kind of setting data that the user wishes to analyze. This effectively assists the user in the user's analysis for what caused an event.

Also, once setting data has been collected from the controller 21 for backup purposes, change information can also be output. That is, it is not necessary to collect the setting data only for the purpose of outputting change information. This more efficiently saves the processing load on the controller 21 and the management server 10 and the communication load on the network.

5. Modifications

Modifications of the above-described embodiments will be described below.

Figure 11:
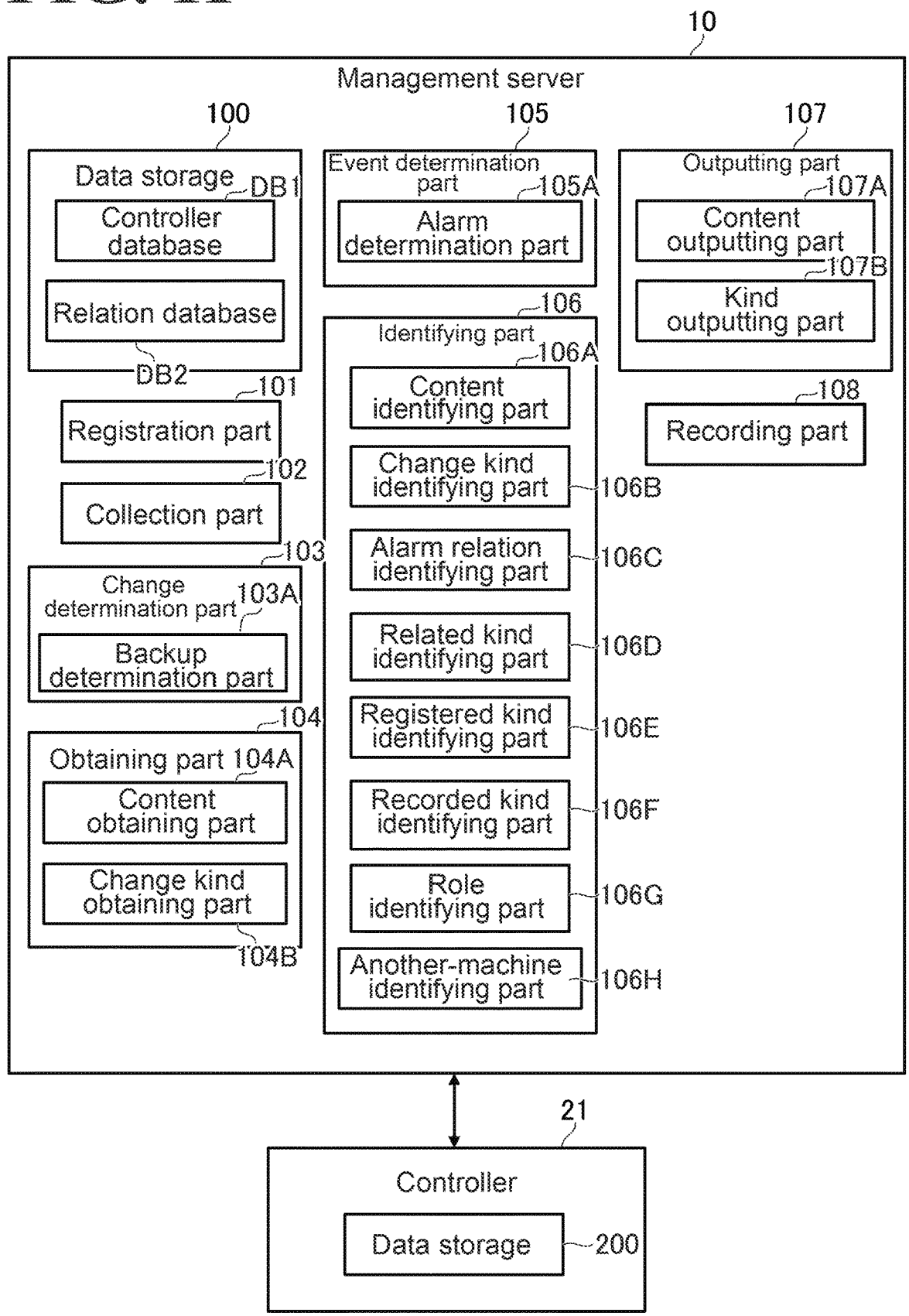
FIG. 11 is a functional block diagram of modifications of the embodiment.

FIG. 11 is a functional block diagram of a modification of the above-described embodiment. As illustrated in FIG. 11, the management server 10 includes a recording part 108, a recorded kind identifying part 106F, a role identifying part 106G, and an another-machine identifying part 106H. These functions are mainly implemented by the CPU 11.

Modification 1

In the above-described embodiment, the user manually registers a relationship between an alarm code and a piece of setting data. In modification 1, a relationship between an alarm that occurs in the controller 21 and setting data that was changed most recently is statistically analyzed, and a relationship between an alarm code and related setting data is identified.

FIG. 12 illustrates an example relation database DB2 of modification 1. As illustrated in FIG. 12, the relation database DB2 stores controller names, alarm codes, alarm names, and degrees of relation of setting data. That is, the relation database DB2 stores a degree of relation of setting data on an individual alarm basis.

As used herein, the term "degree of relation" refers to how closely a piece of setting data is related to an alarm. A higher degree of relation indicates a higher probability of relation to an alarm. The degree of relation is updated upon occurrence of an alarm and based on a version of setting data to which a most recent change (an m-th change (m is a natural number)) was made. For example, as m is greater at the time of occurrence of an alarm, the degree of relation is higher.

In modification 1, the management server 10 includes the recording part 108 and the recorded kind identifying part 106F. When one alarm among a plurality of kinds of alarms is determined as occurring, the recording part 108 records, in relation to the kind of the one alarm, a kind of setting data that was changed at least most recently. Since a kind of alarm is identified by an alarm code, the recording part 108 records, in relation to an alarm code, a kind of setting data that was changed at least most recently.

As used herein, the term "setting data that was changed at least most recently" refers to a version of setting data to which an m-th change, at the latest, was made as of time after the alarm occurred. In modification 1, m is set at 1. In another possible example, in may be two or more. Specifically, the kind of setting data that may be recorded are, with the time at which the alarm occurred taken as a reference: a version of setting data to which a most recent change was made; and a version of setting data to which a second or later change was made.

In modification 1, the degree of relation of setting data is set on an individual alarm code basis. By increasing the degrees of relation of pieces of setting data, the recording part 108 records a kind of setting data that was changed at least most recently. For example, when an alarm occurs, the recording part 108 refers to the changed-unchanged information included in the controller database DB1, and identifies the name of the setting data to which the most recent, m-th change was made. Then, the recording part 108 increases the degree of relation of the setting data made to be related to the alarm code of the alarm that occurs.

In modification 1, the amount by which to increase the degree of relation at a time is one. The amount, however, may be any other amount, such as two or more. In one example, when m is two or more, the recording part 108 may increase the degree of relation by giving a greater weight to a piece of setting data closer to the time at which the alarm occurred. In another example, when past two changes made to setting data after the time of alarm occurrence are considered, the recording part 108 may add two to the degree of relation of the most recent version of setting data, and may add one to the degree of relation of the second most recent version of setting data. This ensures that as the time at which a piece of setting data was changed is closer to the time at which an alarm occurred, the degree of relation of the piece of setting data to the alarm occurrence increases.

When one alarm among a plurality of kinds of alarms is determined as occurring after the recording part 108's recording, the recorded kind identifying part 106F identifies, based on the recorded content recorded by the recording part 108's recording, change information of the kind of setting data related to the kind of the alarm. In modification 1, the content of the recording part 108's recording is recorded in the relation database DB2. Therefore, based on the relation database DB2, the recorded kind identifying part 106F identifies the kind of setting data related to the alarm. For example, the recorded kind identifying part 106F may identify a piece of setting data having the highest degree of relation, or may identify a predetermined series of setting data arranged in decreasing order of degree of relation. The processing after the related setting data has been identified is as described in the above embodiment. By this processing, the alarm detail screen G3 displays the change information of the setting data that has been identified.

Thus, in modification 1, when one alarm among a plurality of kinds of alarms is determined as occurring in an industrial machine, the management server 10 records, in relation to the kind of the one alarm, a kind of setting data that was changed at least most recently. Then, based on what has been recorded, the management server 10 identifies change information of a kind of setting data related to the kind of the one alarm that occurs in the industrial machine. Thus, the change information is output based on a statistical analysis of a relationship between an alarm that occurred in the past and the kind of setting data that is changed. This ensures that the change information provided is regarding a piece of setting data that is more closely related to the alarm that occurs in the industrial machine. This effectively assists the user in the user's analysis for what caused the alarm.
Modification 2

It is possible that setting data related to an alarm varies depending on the role of the controller 21. As used herein, the term "role" may refer to the application in which the controller 21 is used. For example, when the controller 21 machines a workpiece, the kind of machining performed by the controller 21 corresponds to the role of the controller 21. In other words, the kind of step that the controller 21 is in charge of corresponds to the role of the controller 21. It is possible to, for each of roles of the controllers 21, register a piece of setting data related to an alarm and to identify a piece of setting data corresponding to the role of the controller 21 in which an alarm occurs.

The following description of modification 2 is regarding an example in which the robot 22 is used in food processing. Specifically, it will be assumed that a plurality of production lines exist in a facility and that four steps, namely, material generating step, shaping step, heating step, and wrapping step are performed on each of the production lines. On each of the production lines, four sets of controllers 21 and robots 22 are used to perform the corresponding step. It is often the case that what causes an alarm in the controller 21 working on the material generating step on one of the production lines, A, is the same as what causes an alarm in the controller 21 working on the material generating step on another one of the production lines, B. Similarly, it is often the case that the shaping step, the heating step, and the wrapping step each have a unique situation in which an alarm is caused to occur in the controller 21 on each production line. In light of the considerations above, related setting data may be registered for each role of the controller 21 (for each step that the controller 21 is in charge of).

In modification 2, the management server 10 includes the role identifying part 106G. When an alarm is determined as occurring, the role identifying part 106G identifies, based on the role of the controller 21, change information related to the alarm. In modification 2, it will be assumed that the roles of the controllers 21 are stored in the controller database DB1.

As described in the above embodiment, when the user manually registers setting data related to an alarm, an example of how data is stored in the relation database DB2 is as illustrated in FIG. 7. It is to be noted, however, that the above embodiment is regarding a case where setting data related to an alarm is registered for each controller 21 (on an individual controller 21 basis), while modification 2 is regarding a case where setting data related to an alarm is registered for each role of the controller 21. In the food processing example described earlier, setting data related to an alarm is registered for each step (on an individual step basis).

When an alarm occurs in a controller 21, the role identifying part 106G refers to the controller database DB1, and identifies the role of the controller 21 in which the alarm occurs. Then, the role identifying part 106G refers to the relation database DB2. Then, based on the registered content corresponding to the role that has been identified, the role identifying part 106G identifies change information related to the alarm. For example, the role identifying part 106G identifies setting data made to be related to both the role of the controller 21 in which the alarm occurs and the alarm code of the alarm. The processing after the related setting data has been identified is as described in the above embodiment. By this processing, the alarm detail screen G3 displays the change information of the setting data that has been identified.

While modification 2 is regarding an example in which the user manually specifies setting data related to an alarm, it is possible to statistically analyze setting data related to an alarm, as in modification 1. In this case as well, the processing performed in modification 2 is applicable. In the statistical analysis configuration, an example of how data is stored in the relation database DB2 is as illustrated in FIG. 12. The relation database DB2 stores the degree of relation of each piece of setting data for each role of the controller 21. When an alarm occurs in a controller 21, the recording part 108 updates a degree of relation made to be related to the role of the controller 21. When an alarm is determined as occurring, the role identifying part 106G identifies, based on the degree of relation related to the role of the controller 21, setting data related to the alarm. The processing of identifying setting data based on the degree of relation is as described in modification 1.

Thus, in modification 2, when a predetermined alarm occurs in the controller 21, the management server 10 identifies change information based on the role of the controller 21 and outputs the change information. This ensures that information useful for analyzing what caused the predetermined alarm to occur in the controller 21 is provided. This effectively assists the user in the user's analysis for what caused the predetermined alarm.
Modification 3

It is possible that an alarm occurring in a controller 21 in charge of a step is not attributed to the setting data of the controller 21 itself but is attributed to the setting data of another controller 21 in charge of a step performed before or after the above step. In light of this, when an alarm occurs in a controller 21, the setting data of another controller 21 may be displayed as setting data related to the alarm. In the food processing example described in modification 2, an alarm occurring in the controller 21 in charge of the shaping step may be attributed to the setting data of the controller 21 in charge of the material generating step, which is a step previous to the shaping step. In light of this, when an alarm occurs in the controller 21 in charge of the shaping step, it is possible to display change information of the setting data of the controller 21 in charge of the material generating step.

In this modification, the management server 10 includes the another-machine identifying part 106H. It will be assumed that a plurality of controllers 21 belong to the identical production line. When an alarm is determined as occurring in one controller 21 among the plurality of controllers 21, the another-machine identifying part 106H identifies change information of another controller 21. The another controller 21 may be any controller 21 that belongs to the production line to which the controller 21 in which the alarm occurs belongs. In one example, the another-machine identifying part 106H may identify change information of all the other controllers 21 belonging to the identical production line. In another example, the another-machine identifying part 106H may identify change information of some other controllers 21 belonging to the identical production line. In another example, the another-machine identifying part 106H may identify: change information of another controller 21 in charge of the step performed previous to the step that the controller 21 in which the alarm occurs is in charge of; and change information of another controller 21 in charge of the step performed after the step that the controller 21 in which the alarm occurs is in charge of. In another example, the another-machine identifying part 106H may identify either one of these two pieces of change information. In another example, the another-machine identifying part 106H may identify change information of all the other controllers 21, instead of change information of the controllers 21 in charge of the previous and next steps.

Thus, when a predetermined event occurs in the controller 21, another controller 21 belonging to the identical production line may be attributed to the predetermined event. In light of this, in modification 3, the management server 10 outputs change information of the another controller 21. This ensures that information useful for analyzing what caused the predetermined event is provided. This effectively assists the user in the user's analysis for what caused the predetermined event.

Modification 4

The above-described described modifications may be combined with each other.

In another example, the management server 10 may not necessarily collect the setting data for backup purposes but may collect the setting data at any desired timing such as time when an alarm occurs. While in the above-described embodiment and modifications the main functions are implemented by the management server 10, the main functions may be assigned to a plurality of computers.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. An industrial machine management system, comprising:
   a management device including a data storage and circuitry; and
   a first industrial machine that stores a changeable program including program codes, wherein
   the program codes include a movement code that indicates a position of a second industrial machine,
   the first industrial machine executes the program and controls a physical movement of the second industrial machine,
   the circuitry is configured to:
      collect a changeable program of an industrial machine as a backup, and
      determine whether the movement code has been changed, by comparing the program collected as the backup at a first time point with the program collected at a second time point different from the first time point,
   the data storage is configured to store the program collected as the backup at the first time point and change-unchanged information regarding whether the movement code has been changed, and
   the circuitry is configured to:
      obtain change information regarding a change of the movement code based on the change-unchanged information and the program collected as the backup at the first time point,
      determine whether a predetermined event has occurred in the first industrial machine,
      identify, when the predetermined event is determined as having occurred, the change information such that the change information is related to the predetermined event, and
      output the change information that is identified.

2. The industrial machine management system according to claim 1, wherein the circuitry is further configured to obtain change content information as the change information, the change content information regarding a content of the change of the movement code, identify, when the predetermined event is determined as having occurred, the change content information such that the change content information is related to the predetermined event, and output the change content information that has been identified.

3. The industrial machine management system according to claim 1, wherein the program includes a plurality of kinds of programs changeable in the first industrial machine, and the circuitry is further configured to obtain change kind information as the change information, the change kind information regarding a kind of the program, identify, when the predetermined event is determined as having occurred, the change kind information such that the change kind information is related to the predetermined event, and output the change kind information that has been identified.

4. The industrial machine management system according to claim 1, wherein the circuitry is further configured to determine whether an alarm has occurred as the predetermined event in the first industrial machine, and identify, when the alarm is determined as having occurred, the change information such that the change information is related to the alarm.

5. The industrial machine management system according to claim 1, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined as having occurred, the change information of one kind of program among the plurality of kinds of programs such that the one kind of program is related to the one kind of event.

6. The industrial machine management system according to claim 5, wherein the circuitry is further configured to register, for each of the plurality of kinds of events, a kind of program, among the plurality of kinds of programs, that has been specified by a user, and identify, when one kind of event among the plurality of kinds of events is determined as having occurred, the change information of one kind of program among the plurality of kinds of programs based on a registered content such that the one kind of program is related to the one kind of event.

7. The industrial machine management system according to claim 5, wherein the circuitry is further configured to relate, when one kind of event among the plurality of kinds of events is determined as having occurred, the one kind of event to a kind of program, among the plurality of kinds of programs, to which the change has been made most recently, and record the kind of program, and identify, when the one kind of event is determined as having occurred after the circuitry recorded the kind of program, the change information of one kind of program among the plurality kinds of programs based on a recorded content recorded by the circuitry such that the one kind of program is related to the one kind of event.

8. The industrial machine management system according to claim 1, wherein the circuitry is further configured to identify, when the predetermined event is determined as having occurred, the change information based on a role of the first industrial machine such that the change information is related to the predetermined event.

9. The industrial machine management system according to claim 1, wherein the first industrial machine is one of a plurality of industrial machines belonging to an identical production line, and the circuitry is configured to identify, when the predetermined event is determined as having occurred in one industrial machine among the plurality of industrial machines, the change information of another industrial machine among the plurality of industrial machines.

10. A method for an industrial machine system that includes a first industrial machine that stores a changeable program including program codes, the program codes including a movement code that indicates a position of a second industrial machine, the first industrial machine executing the program and controlling a physical movement of the second industrial machine, the method comprising:
  collecting a changeable program of an industrial machine as a backup:
  determining whether the movement code has been changed, by comparing the program collected as the backup at a first time point with the program collected at a second time point different from the first time point;
  storing the program collected as the backup at the first time point and change-unchanged information regarding whether the movement code has been changed;
  obtaining change information regarding a change of the movement code based on the change-unchanged information and the program collected as the backup at the first time point;
  determining whether a predetermined event has occurred in the first industrial machine;
  identifying, when the predetermined event is determined as having occurred, the change information such that the change information is related to the predetermined event; and
  outputting the change information that is identified.

11. A non-transitory computer-readable storage medium storing a program for causing a system, which includes a first industrial machine that stores a changeable program including program codes, the program codes including a movement code that indicates a position of a second industrial machine, the first industrial machine executing the program and controlling a physical movement of the second industrial machine, to execute a method, the method comprising:
  collecting a changeable program of an industrial machine as a backup;
  determining whether the movement code has been changed, by comparing the program collected as the backup at a first time point with the program collected at a second time point different from the first time point,
  storing the program collected as the backup at the first time point and change-unchanged information regarding whether the movement code has been changed;
  obtaining change information regarding a change of the movement code based on the change-unchanged information and the program collected as the backup at the first time point;
  determining whether a predetermined event has occurred in the first industrial machine;
  identifying, when the predetermined event is determined as having occurred, the change information such that the change information is related to the predetermined event; and
  outputting the change information that is identified.

12. The industrial machine management system according to claim 2, wherein the program includes a plurality of kinds of programs changeable in the first industrial machine, and the circuitry is further configured to obtain change kind information as the change information, the change kind information regarding a kind of the program, identify, when the predetermined event is determined as having occurred, the change kind information such that the change kind information is related to the predetermined event, and output the change kind information that has been identified.

13. The industrial machine management system according to claim 2, wherein the circuitry is further configured to determine whether an alarm has occurred as the predetermined event in the first industrial machine, and identify, when the alarm is determined as having occurred, the change information such that the change information is related to the alarm.

14. The industrial machine management system according to claim 3, wherein the circuitry is further configured to determine whether an alarm has occurred as the predetermined event in the first industrial machine, and identify, when the alarm is determined as having occurred, the change information such that the change information is related to the alarm.

15. The industrial machine management system according to claim 2, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined as having occurred, the change information of one kind of program among the plurality of kinds of programs such that the one kind of program is related to the one kind of event.

16. The industrial machine management system according to claim 3, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined has occurred, the change information of one kind of program among the plurality of kinds of programs such that the one kind of program is related to the one kind of event.

17. The industrial machine management system according to claim 4, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined as having occurred, the change information of one kind of program among the plurality of kinds of programs such that the one kind of program is related to the one kind of event.

18. The industrial machine management system according to claim 12, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined as having occurred, the change information of one kind of program among the plurality of kinds of programs such that the one kind of program is related to the one kind of event.

19. The industrial machine management system according to claim 13, wherein the program includes a plurality of kinds of programs changeable in the first industrial machine, and the predetermined event is one of a plurality of kinds of events occurrable in the first industrial machine, and the circuitry is further configured to identify, when one kind of event, among the plurality of kinds of events, is determined as having occurred, the change information of one kind of program among the plurality of kinds of programs such that the one kind of program is related to the one kind of event.

20. The industrial machine management system according to claim 1,
wherein the program codes include the movement code and other codes that are different from the movement code,
wherein when the movement code has been changed, the circuitry considers that the program has been changed, and
wherein when the other codes have been changed and the movement code has not been changed, the circuitry considers that the program has not been changed.

\* \* \* \* \*